United States Patent
Michel et al.

(10) Patent No.: US 9,479,757 B2
(45) Date of Patent: Oct. 25, 2016

(54) STRUCTURED-LIGHT PROJECTOR AND THREE-DIMENSIONAL SCANNER COMPRISING SUCH A PROJECTOR

(71) Applicant: Commissariat A L'Energie Atomique et Aux Energies Alternatives, Paris (FR)

(72) Inventors: Remi Michel, Bures-sur-Yvette (FR); David Partouche-Sebban, Bruyeres le Chatel (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/970,683

(22) Filed: Dec. 16, 2015

(65) Prior Publication Data

US 2016/0173855 A1    Jun. 16, 2016

(30) Foreign Application Priority Data

Dec. 16, 2014    (FR) .................................... 14 62551

(51) Int. Cl.

| G01B 5/04 | (2006.01) |
|---|---|
| H04N 13/02 | (2006.01) |
| G02B 5/04 | (2006.01) |
| G02B 5/18 | (2006.01) |
| H04N 9/31 | (2006.01) |
| G01B 11/25 | (2006.01) |

(Continued)

(52) U.S. Cl.
CPC ....... *H04N 13/0203* (2013.01); *G01B 11/2513* (2013.01); *G02B 5/04* (2013.01); *G02B 5/1842* (2013.01); *G02B 27/10* (2013.01); *G02B 27/22* (2013.01); *G03B 21/2013* (2013.01); *H04N 9/3105* (2013.01); *H04N 9/3167* (2013.01); *H04N 13/0253* (2013.01); *H04N 13/0271* (2013.01)

(58) Field of Classification Search
CPC .................................................. H04N 13/0203
See application file for complete search history.

(56) References Cited

U.S. PATENT DOCUMENTS

| 7,864,419 B2 * | 1/2011 | Cossairt | ............. G02B 27/0087 359/446 |
|---|---|---|---|
| 2002/0196415 A1 * | 12/2002 | Shiratani | ................ G01B 11/25 353/31 |

(Continued)

OTHER PUBLICATIONS

Geng, Jason, "Structured—light 3D surface imaging: a tutorial," IEEE, Intelligent Transportation System Society, Rockville, Maryland, Advances in Optics and Photonics 3, published Mar. 31, 2011, 33 pages.

(Continued)

*Primary Examiner* — King Poon
*Assistant Examiner* — Ibrahim Siddo
(74) *Attorney, Agent, or Firm* — Brinks Gilson & Lione

(57) ABSTRACT

A structured-light projector including a light source, an optical system for spectral decomposition, an encoding device, an optical system for spectral recombination and an optical system for projection. The encoding device includes a mask that includes a binary encoding matrix pattern formed from 2*n rows and m columns, a sub-pattern defined by the rows "1" to "n" being illuminated by an image of the beam with the wavelength λmin and a sub-pattern defined by the rows "n+1" to "2*n" being illuminated by an image of the beam with a wavelength λmax. The two sub-patterns being identical or complementary, and two neighboring columns each including a different binary encoding from the other.

17 Claims, 18 Drawing Sheets

(51) Int. Cl.
*G02B 27/10* (2006.01)
*G02B 27/22* (2006.01)
*G03B 21/20* (2006.01)

(56) References Cited

U.S. PATENT DOCUMENTS

2007/0115484 A1  5/2007  Huang et al.
2010/0008588 A1  1/2010  Feldkhun et al.
2011/0050859 A1  3/2011  Kimmel et al.
2014/0028800 A1  1/2014  Tin

OTHER PUBLICATIONS

French Search Report issued Nov. 10, 2015 in French Application No. FR 1462551 (French language), 2 pages.

\* cited by examiner

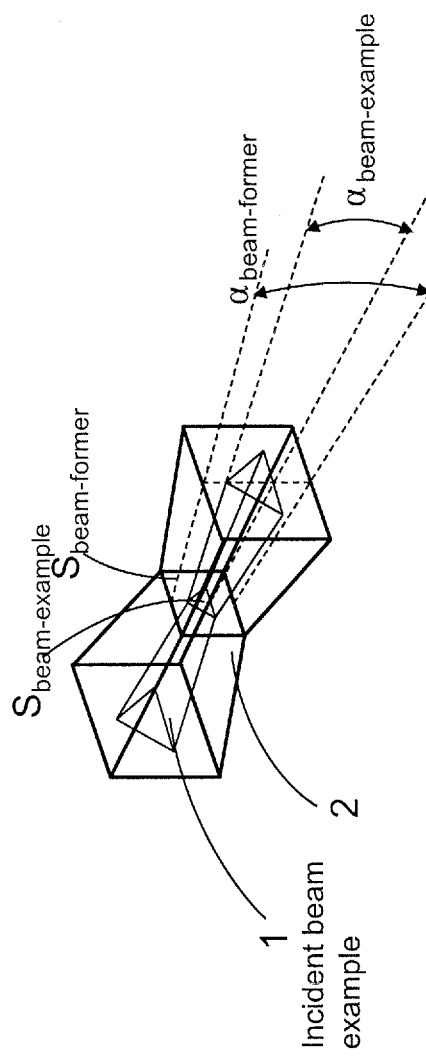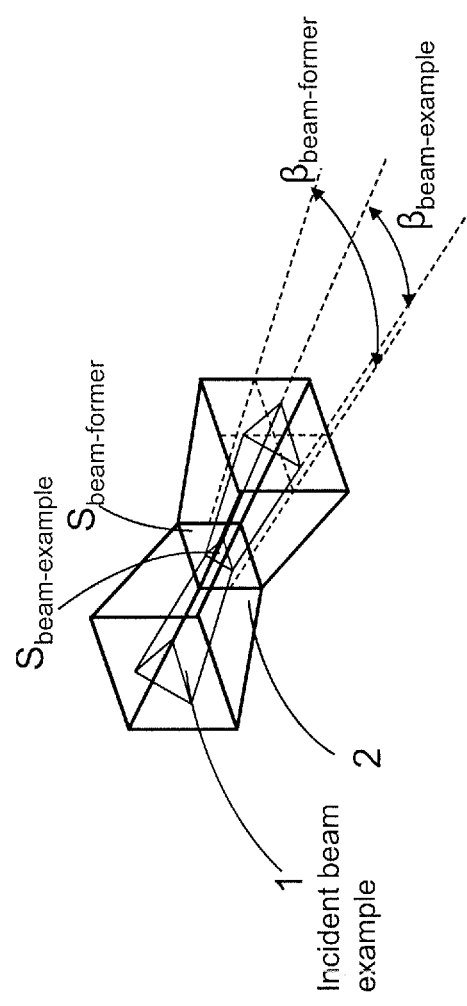

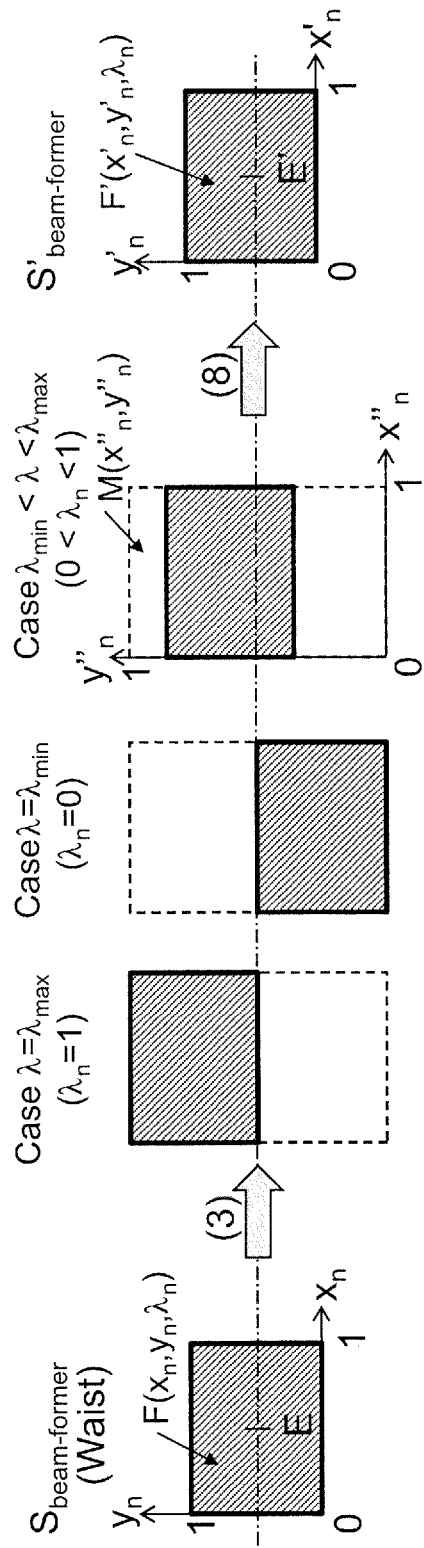

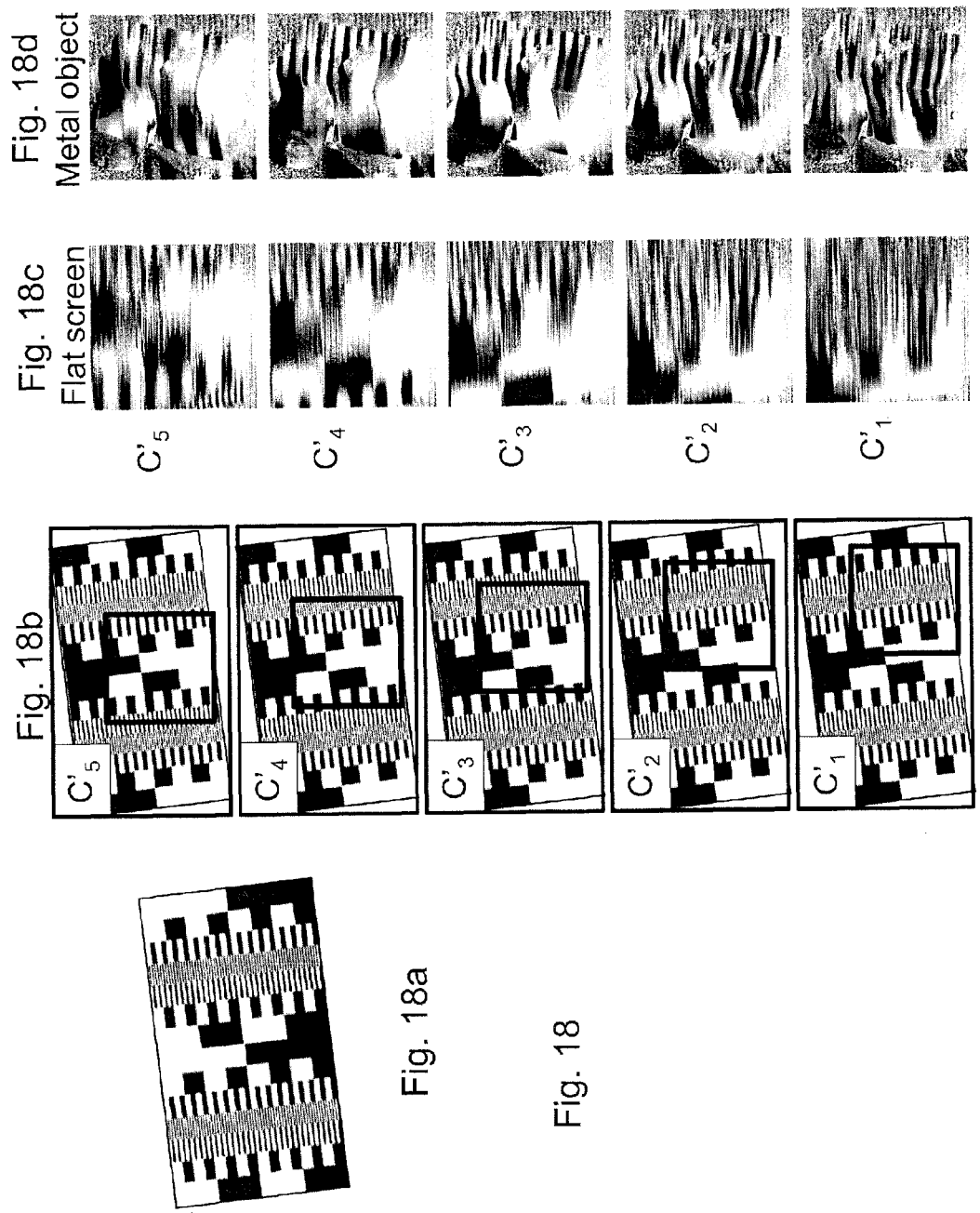

STRUCTURED-LIGHT PROJECTOR AND THREE-DIMENSIONAL SCANNER COMPRISING SUCH A PROJECTOR

RELATED APPLICATIONS

This application claims priority under 35 U.S.C. §119 to French Patent Application No. 1462551 filed Dec. 16, 2014, the entire content of which is hereby incorporated by reference.

TECHNICAL FIELD

The present application concerns a structured-light projector, in particular a structured-light projector for a three-dimensional scanner, as well as a three-dimensional scanner comprising such a projector.

BACKGROUND

Three-dimensional scanners are devices which enable geometrical coordinates (x, y, z) to be measured for each point of the surface of a scene or of an object. The result of the measurement is often considered as a so-called "depth" map of the scene taken as an image since the depth (or distance) z is generally expressed on the basis of the position (x, y) in a Cartesian coordinate system. The depth maps so collected may then be used to construct three-dimensional synthetic images (digital objects) for various purposes.

Several scanner technologies are used: some require a physical contact with the surface to digitize, for example coordinate measuring machines (CMMs) for which the measurement is carried out by palpating the surface by means of a probe or stylus. Others enable the measurement to be made without physical contact, for example the stereoscopic systems based on the use of two cameras, slightly spaced apart and pointing towards the same scene, for which the depth is deduced from the geometrical deformation between the two images.

So-called "structured-light" three-dimensional scanners are a specific family of contact-free three-dimensional scanners. These scanners are constituted by a light projector, generally produced on the principle of a video projector or constituted by a laser system generating interference fringes (for the so-called "phase-shifting" technique), and at least one camera that is geometrically offset relative to the projector in order to produce a stereoscopic configuration. The projector projects a so-called "structured" pattern of light, having one or two geometrical dimensions (for example a line or an image) which may possibly be colored, onto the surface to measure. The camera, positioned at a distance from the projector called "stereo basis", acquires and records an image of the scene. The projected structured pattern is constituted by elementary patterns (called "structured elements" in this document) appropriately chosen so that it is possible to detect them in the acquired image.

The geometrical position (x, y, z) of each point of the surface of the scene observed is obtained by a triangulation method between the directions of projection and imaging of each structured element. The patterns used in the structured light three-dimensional scanners are generally projected in black and white, in grayscale, in color or in a combination of the three effects (this is for example set out in the paper by J. Geng, "Structured-Light 3D surface imaging: a tutorial", Advances in Optics and Photonics 3, pp. 128-160, 2011). If the scene observed is static, "multiple-shot" methods of (temporally) sequential projections of patterns (for example the techniques known as "phase shifting", "binary patterns" or "gray coding"), enable accurate and reliable measurements to be obtained thanks to the complementarity of the information available in the images of the sequence (see for example J. Geng, 2011). If the scene to observe is moving, it is necessary to use non-sequential projection methods, with one image (known as "single-shot"), or even with two images (known as "two-shot") if the acquisition of the two images is sufficiently fast relative to the movement of the actual scene. Non-sequential techniques require projecting multiple structured elements that are sufficiently different from each other in order to be identifiable in the image acquired by the camera. These structured elements may, for example, be bands of which the colors are defined by a so-called "De Bruijn" sequence, or another possibility is coded point clouds (see J. Geng, 2011).

With the surface to digitize has high gradients of relief or discontinuities (holes or occlusions for example), the depth map produced by the structured-light three-dimensional scanner of the prior art by means of non-sequential techniques may be biased or incomplete near those singular shapes since certain structured elements projected are then only partially observable (i.e. in part concealed) or too distorted, and are not therefore always identifiable in the image acquired by the camera.

Furthermore structured-light three-dimensional scanners of the prior art essentially make it possible to produce the depth map of the scene taken as an image, or even possibly to provide information as to its appearance (color, texture, etc.), but they do not give quantitative data making it possible to deduce the nature of the materials constituting the elements of the scene.

Such information, used conjointly with the depth map, would be very useful to produce, accurately and automatically, an identification and a classification of the elements of the scene.

A method is proposed in the published patent application Nos. U.S. 2014/0028800 and U.S. 2014/0028801. It relies on a theoretical utilization of a device for projecting structured light in the spectral domain and an imaging device enabling a measurement to be made of the light reflected (or scattered) by the surface of the scene or by the object observed. The structuring of the grounds is made in the spectral domain rather than in the geometrical, colorimetric and/or temporal domains. The spectral information reflected by surface of the elements of the scene constitutes an item of data useful for determining the nature of the materials observed. It is also suggested, by way of example, to perform a multispectral projection of binary geometrical patterns, in a manner similar to the "binary patterns" technique except that the binary patterns are not projected sequentially in time but simultaneously at different wavelengths, the separation of the images ultimately being provided by the spectral imaging device. In other words, the method proposed in these patent documents relies on a hypothetical use of a projector endowed with several wavelength channels that are relatively narrow making it possible to simultaneously project different geometrical images from one wavelength channel to another. Furthermore, it is indicated that the number of channels of the projector must be quite high, typically greater than 10 by analogy with the "binary patterns" technique, to ensure sufficient accuracy in the depth map of the scene. However, no device making it possible to implement the method is described or even proposed. It is however mentioned in these documents that the wavelength channels of the projector may possibly be associated with the use of monochrome sources such as laser sources or LEDs, but the technical features enabling a prototype to be achieved are not given.

The commercially available video projectors do not enable that need to be met.

As a matter of fact, the commercially available video projectors are generally endowed with the three colorimetric channels corresponding to the colors red, green and blue (RGB), as is for example described in the published patent application Nos. U.S. Pat. No. 6,247,814B1 and U.S.2004085634A1, which is sufficient to project structured elements into the geometrical, colorimetric and temporal domains, but not to measure a spectral reflectance of the observed scene with accuracy, since this requires a wide range of wavelengths.

There are however video projectors having more than three colorimetric channels (see for example the published patent application Nos. WO2006096598A2, U.S.2010156958A1 and U.S.2010315596A1) but these projectors are bulkier and more costly, in particular on account of the fact that they comprise a more complex optical color separation prism, and that it is necessary to add a micromirror array (DMD-Digital Micromirror Device) per additional colorimetric channel.

Lastly, in order to optimize the measurement accuracy of the depth map and of the reflected spectral information, it would be desirable to be able to modify, in real time, the number and the ranges of wavelengths of the projector channels to adapt the structured light projected to the spectral characteristics of the ambient lighting and to the reflectance (that is to say the optical signature) of the elements of the scene. This last feature can only be implemented in very limited manner with a projector of which the wavelength channels are set at the time of manufacture by the selected monochrome sources.

SUMMARY

The object of the present invention is directed to solving the aforesaid problems at least partially to project structured light in the spectral domain.

To that end, there is provided a structured-light projector comprising a device for spectral coding of light beams wherein the optical coding of the light beam is for example provided by a component which may be passive (for example an optical mask) or active (for example a DMD cell).

More specifically, according to a first aspect, there is provided a structured-light projector successively comprising:

a light source configured to emit a beam with a continuous spectrum between a minimum wavelength ($\lambda$min) and a maximum wavelength ($\lambda$max), an optical system for spectral decomposition, configured to capture the spectrum of the beam emitted by the light source and to spectrally decompose it with an image of the beam at the minimum wavelength ($\lambda$min) juxtaposed with an image of the beam at the maximum wavelength ($\lambda$max) in at least one predetermined plane that is transverse to an optical path of the beam and along a line of that plane constituting a boundary, an encoding device configured to encode the spectrally decomposed spectrum.

the encoding device comprising a mask, the mask being positioned in the predetermined plane, and the mask comprising a binary encoding matrix pattern formed from a series of 2*n rows and a series of m columns, wherein "n" is equal to or greater than 4, or even 5, or even 7, or still again even 8 or 9, and wherein "m" is equal to or greater than 16, or even 32, or even 128, or still again even 256, a demarcation between the rows "n" and "n+1" being superposed on said boundary, a sub-pattern defined by the rows "1" to "n" being illuminated by the image of the beam with the wavelength $\lambda$min and a sub-pattern defined by the rows "n+1" to "2*n" being illuminated by the image of the beam with the wavelength $\lambda$max, the sub-pattern defined by the rows "1" to "n" being identical to or complementary with the sub-pattern defined by the rows "n+1" to "2*n", and a sub-pattern defined by the rows "i" to "i+n−1", i being comprised between 2 and n, being illuminated by an image of the beam with a given wavelength $\lambda$ comprised between $\lambda$min and $\lambda$max, the m columns being perpendicular to that demarcation and two neighboring columns each comprising a different binary encoding from the other, an optical system for spectral recombination configured to recombine the spectrally decomposed and encoded spectrum into a recombined beam, and an optical projection system configured to project the recombined beam onto a scene to observe.

Such a projector thus for example presents the following advantages:

(1) It is simple to manufacture: in certain configurations provided by the present invention, a high number of spectral channels may be obtained with a single light source, a single optical coding component and a limited number of standard optical components (lenses, mirrors, prisms, gratings, etc.).

(2) The source used may be incoherent and with a broad spectrum and it is thus not necessary to have recourse to a set of monochrome sources to produce spectral channels for projection. Therefore, a wide variety of natural sources (sun, daylight, etc.) or artificial sources (incandescent lamp, polychromatic LEDs, etc.) may be employed.

(3) In certain configurations provided by the present invention and in the case of the use of an active component for optical coding, the number and the ranges of the wavelengths for the projector channels may be modified in real time.

The mask advantageously comprises at least m/5 different encodings in the m columns.

This contributes to reducing an interpretation ambiguity in post-processing the acquired images.

Furthermore, an encoding is advantageously repeated in at most 5 columns.

This contributes to reducing a complexity of the algorithm for determining the depth map.

It is thus even more advantageous for both the preceding conditions to be implemented.

According to an advantageous example, the m columns of the sub-pattern defined by rows "1" to "n" comprise a maximum of 5 repetitions of the same series of encodings that are different from each other. That is to say for example an encoding according to the columns of the "ABCABCAB-CABCABC" type; in this case this is encoding of m=15 columns comprising m/5=3 different encodings with each encoding repeated 5 times and each encoding series "ABC" also repeated here 5 times.

Preferably, the m columns of the sub-pattern defined by rows "1" to "n" comprise encodings that are all different from each other.

That is then a preferred or so-called "perfect" case since each column is then easily identifiable in terms of positioning, it being a configuration of the mask comprising a minimum of ambiguity.

According to another advantageous example, the number of columns "m" is equal to "2^n", n being the number of rows.

For example, the rows of the sub-pattern defined by rows "1" to "n" comprise encodings that represent a succession of powers of 2.

By a succession of powers of 2 it is meant here that the rows of the sub-pattern considered comprise an encoding representing a succession of periodic structures of which the number of periods, from one row to another, is equal to $2^0$, $2^1$, $2^2$, ..., $2^{n-1}$.

According to a particularly advantageous example, the sub-pattern defined by the rows "1" to "n" comprises n rows and m=2^n columns of which the rows comprise encodings representing a succession of powers of 2.

This makes it possible to obtain simple encoding while ensuring that all the columns comprise a different encoding from each other.

Possibly, the encodings of the columns have been mixed.

According to still another example, the sub-pattern defined by the rows "1" to "n" comprises n rows and m=2^n columns of which the rows comprise encodings representing a succession of powers of 2 and have been mixed.

To produce such a mask, the encoding device comprises for example a matrix arrangement of reflective zones and absorbent zones. Or, according to another example, the encoding device comprises a matrix arrangement of transparent zones and opaque zones.

In a configuration operating through transparency/opacity, the encoding device comprises for example, an opto-electronic system constituted by pixels of which the optical transparency is electronically controllable, the mask then being formed by the opto-electronic system.

Such an opto-electronic system that is particularly convenient in the context of the present invention is for example a liquid crystal screen (LCD—Liquid Crystal Display).

In a configuration operating through reflection/absorption, the encoding device comprises for example, an opto-electronic system constituted by pixels of which the optical reflectivity is electronically controllable, the mask then being formed by the opto-electronic system.

Such an opto-electronic system that is particularly convenient in the context of the present invention is for example an array of micromirrors (DMD Digital Micromirror Display).

According to a particularly convenient example embodiment, the light source of the projector comprises a natural light source or an artificial light source.

For example, it may be a continuous artificial light source, for example a filament lamp or incandescent lamp, a halogen lamp, an LED, or the like.

According to an advantageous configuration, the optical system for spectral decomposition and the optical system for spectral recombination are the same optical system passed through in one direction and in the opposite direction by the beam.

Such a configuration makes it possible to render the projector more compact by minimizing the number of components for its production.

According to still another worthwhile example, the projector comprises a diaphragm. The diaphragm is for example positioned between the light source and the optical system for spectral decomposition. It is for example configured to geometrically delimit the beam.

For example, the projector comprises a converging mirror and/or a converging lens positioned between the light source and the optical system for spectral decomposition on an optical path of the beam, or even between the light source and the diaphragm where appropriate.

In a favored embodiment, the optical system for spectral decomposition comprises an optical prism. It may comprise an optical grating.

According to still another advantageous example, the projector comprises at least one objective. The objective comprises for example a converging lens, or a mirror, for example a converging mirror. In a favored configuration, the objective is then positioned after the optical system for spectral decomposition on an optical path of the beam.

For example, the projector comprises a converging lens then a mirror positioned before the optical system for spectral decomposition on an optical path of the beam.

The mirror is then for example configured to send the beam in a different direction according to the needs for compactness to give to the projector.

According to a favored embodiment, the optical system for spectral recombination comprises an optical prism. It may comprise an optical grating.

According to another advantageous example, the projector comprises at least one objective. The objective comprises for example a converging lens, or a mirror, for example a converging mirror. In a favored configuration, the objective is positioned before the optical system for spectral recombination on an optical path of the beam.

According to still another advantageous example, the projector comprises a mirror then a converging lens which are positioned after the optical system for spectral recombination, for example after the prism, on an optical path of the beam.

The mirror is then for example configured to send the beam in a different direction according to the needs for compactness to give to the projector.

According to another aspect of the present invention, there is also provided a structured-light three-dimensional scanner comprising a projector and a detection device, characterized in that the projector is a projector as described above, comprising all or some of the features mentioned earlier, and in that the detection device is a multi-spectral camera.

Advantageously, the camera comprises at least 4 spectral channels.

The camera is for example disposed at a determined distance from the projector, called "stereo basis".

According to a particularly advantageous example embodiment, the multi-spectral camera comprises at least 6 spectral channels, or even 8, or even 9.

According to another advantageous example embodiment, the multi-spectral camera is configured to use a number of spectral channels equal to a number of spectral channels defined by the mask of the encoding device.

According to another example embodiment that is particularly advantageous, in particular for increasing the performance of the scanner when the encoding device is not electronically controllable, the three-dimensional scanner also comprises an electronically controllable secondary light source of which the spectrum is continuous between the minimum wavelength ($\lambda$min) and the maximum wavelength ($\lambda$max), for example a camera flash, in order to illuminate the scene temporarily to enrich the measurement of reflectance of the elements of the scene by one or several acquisition(s) of (an) image(s) with the multi-spectral camera.

BRIEF DESCRIPTION OF THE DRAWING

The invention, according to an example embodiment, will be well understood and its advantages will be clearer on reading the following detailed description, given by way of illustrative example that is in no way limiting, with reference to the accompanying drawings in which.

FIGS. 7*a* and 7*b* present an example of an incident beam which is fully encoded by the encoding device 5, FIG. 8 shows the geometrical positions of the intermediate optical images of the cross-section $S_{beam-former}$ of the beam-former 2 formed on the encoding device 5 according to the wavelength of the light.

Identical elements represented in the aforementioned FIG.s are identified by identical numerical references.

DETAILED DESCRIPTION

Figure 1:
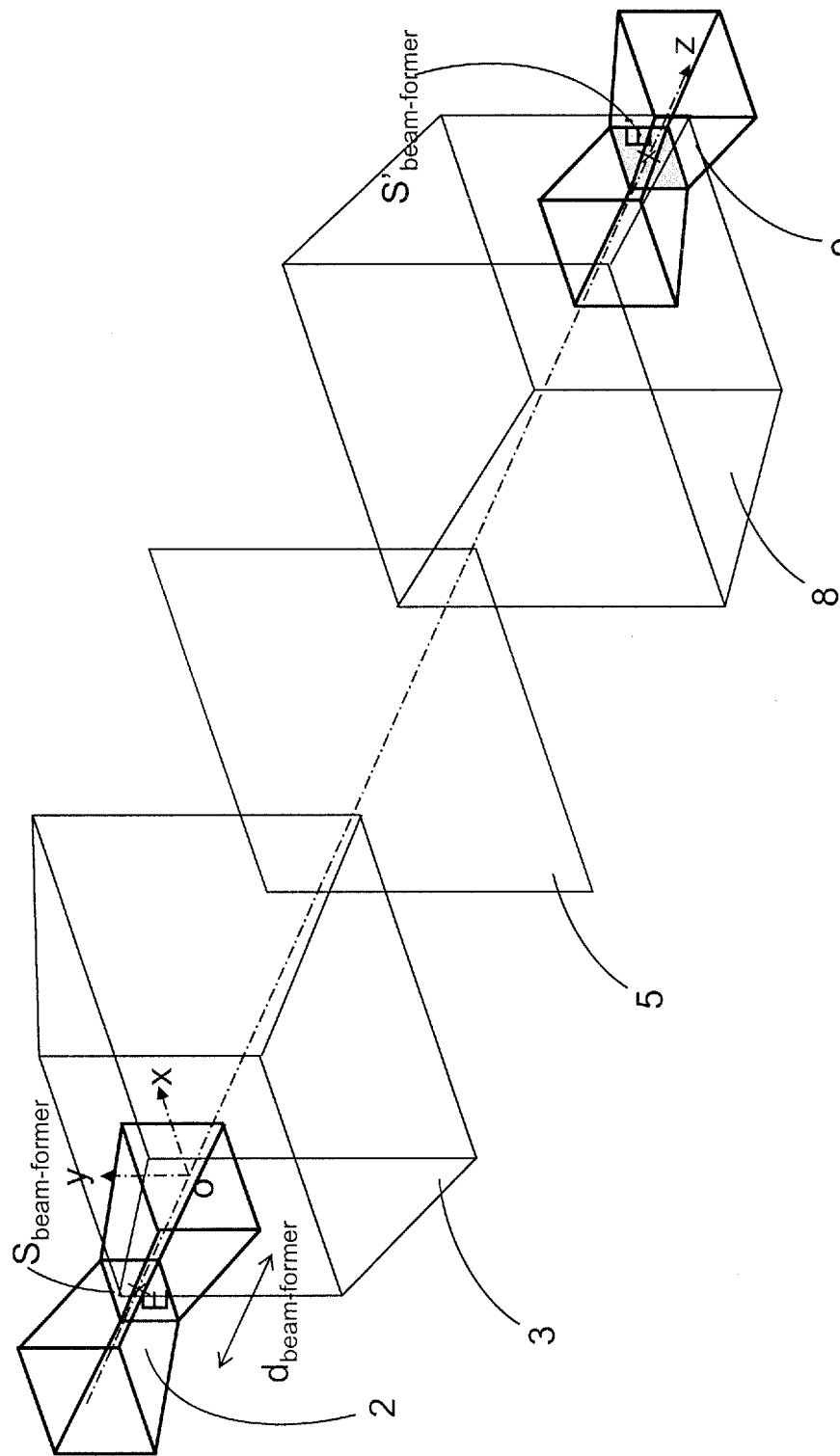
FIG. 1 presents the general principle of a projector according to an example embodiment of the present invention, FIGS. 2*a* and 2*b* detail the geometrical parameters of the beam-former 2.

The general principle of a structured-light projector according to the invention is presented diagrammatically in FIG. 1 according to an example embodiment. The projector mainly comprises (in addition to a light source and an optional projection means not shown on this diagram):

an optical system for spectral decomposition 3, configured to perform geometrical separation of the rays of the incident beam according to their wavelength (for example an angular deviation dependent on the wavelength by means of a prism or optical grating, or for instance a transverse offset of the beam by means of a glass plate with planar parallel faces) in a direction that is essentially transverse to the propagation of the beam, for example here in a vertical direction represented by an axis (Oy), and optionally to focus and/or concentrate the light beam in at least one predetermined plane that is transverse to an optical path of the beam, and for example onto an encoding device 5, also called device for "multiplicative coding" 5, the encoding device 5, configured to encode the spectrum of the spectrally dispersed light beam, for example by partial masking, for example in the case of a grayscale mask, or total masking, for example in the case of a binary mask, of certain zones. To that end, the encoding device 5 comprises for example a mask which is for example an array of micromirrors (DMD-Digital Micromirror Device) for performing the masking through reflection or, to perform the masking through transmission, an optical mask or a liquid crystal display (LCD).

and an optical system for spectral recombination 8, configured to spectrally recombine the light beam, by partially or totally compensating for the geometrical separation (i.e. the spectral dispersion) of the incident rays that is dependent on the wavelength which has been produced by the optical system for spectral decomposition 3.

In the diagram of FIG. 1, the optical system for spectral decomposition 3, the encoding device 5 and the optical system for spectral recombination 8 are represented in line on the same optical axis but in practice the configuration may of course be different given the offsets or deviations of the light beams which may be produced by the optical components constituting those elements, or in the interest of compactness or arrangement of the elements of the projector.

The function of the optical system for spectral recombination 8 could be provided by the optical system for spectral decomposition 3 if the projector is designed such that the light passes twice through the optical system for spectral decomposition 3: for example once in one direction and once coming back in the opposite direction. In other words, the optical system for spectral recombination 8 and the optical system for spectral decomposition 3 may per se be formed from the same elements, and as the same physical entity.

Figure 2A:
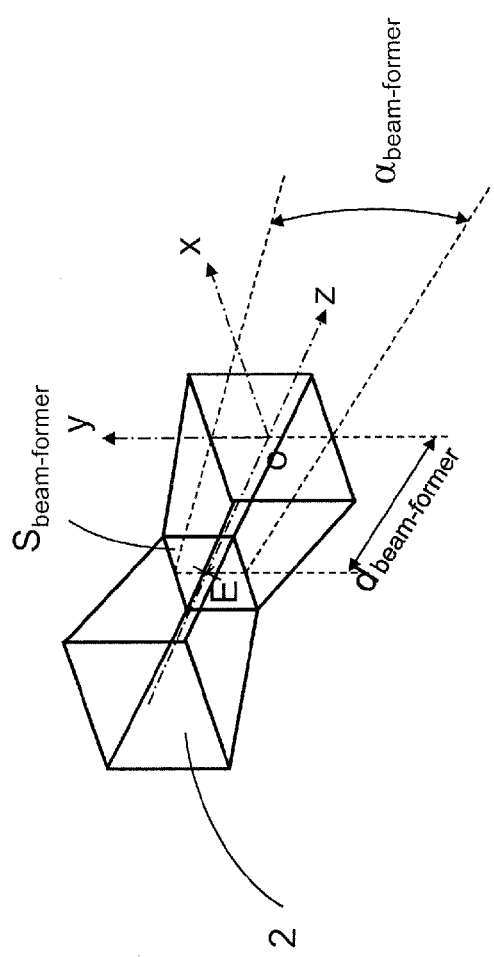
Figure 2B:
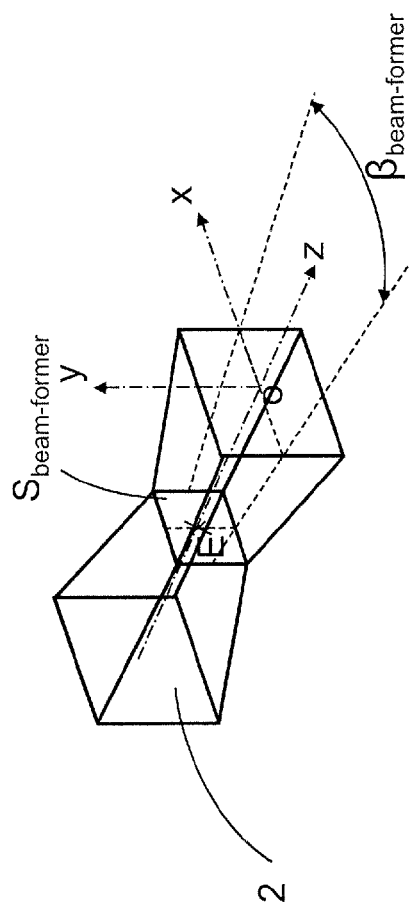

According to the present example embodiment in diagrammatic form, the elements of the projector are possibly configured to encode a geometrically "optimal" incident beam, that is to say that the incident beam is optimized, embodied by a beam-former 2 (see FIGS. 1, 2*a* and 2*b*). The beam-former 2 considered here is centered on the input optical axis (Oz) of the projector. It has for example a rectangular cross-section ($S_{beam-former}$), substantially perpendicular to the input optical axis (Oz), and centered on the axis (Oz) at a point designated focus or concentration point, denoted E. In this document, reference is made to this cross-section of the beam, that is to say the beam formed in the cross-section $S_{beam-former}$, under the name of "waist", which is the English term commonly used in French, by analogy with a laser beam. This cross-section ($S_{beam-former}$) is here positioned at a distance from the optical system for spectral decomposition 3, denoted ($d_{beam-former}$), on the input optical axis (Oz), considered between the point E and an input, at a point O, of the optical system for spectral decomposition 3. The beam-former 2 at the output from the "waist" is furthermore configured to present two angular openings $\alpha_{beam-former}$ and $\beta_{beam-former}$ (represented in FIGS. 2a and 2b) in two directions, respectively here Oy, which here represents a vertical direction, and Ox, which here represents a horizontal direction, at right angles to each other and to the axis (Oz).

In the context of the present invention, a beam-former is considered by default but it could of course be the incident beam not delimited geometrically, as will be described later.

The optional function of focusing the light beam on the multiplicative coding device 5 of the optical system for spectral decomposition 3 consists of fully forming the image of the "waist" (i.e. of the cross-section $S_{beam-former}$) on the device 5.

In the synoptic diagram of FIG. 1, the position of the "waist" of the beam is, in terms of geometrical optics, a real object for the optical system for spectral decomposition 3. However, the present invention is not limited to that configuration of input beam. It also applies if the position of the "waist" is virtual for the optical system 3 or if the "waist" is located at infinity. For example, if it is located between the optical system for spectral decomposition 3 and the multiplicative coding device 5, this means that to produce the function of focusing the light beam on the multiplicative coding device 5 the optical system for spectral decomposition 3 would comprise an essentially diverging optical system, whereas that optical system for spectral decomposition 3 is essentially converging in the case of FIG. 1 in which the "waist" is a real object for the optical system for spectral decomposition 3. Lastly, if the "waist" is at infinity, the optical system for spectral decomposition 3 is possibly essentially converging and the multiplicative coding device 5 is for example positioned at the location of the image focal point of the optical system for spectral decomposition 3, according to the dimensions of the image of the cross-section $S_{beam-former}$ (by the optical system for spectral decomposition 3) and of the mask of the encoding device 5 for example.

The function of focusing/concentration of the light beam on the multiplicative coding device 5 of the optical system for spectral decomposition 3 is generally an advantage to produce a projector of which the richness of the spectral encoding is optimized, that is to say that the rate of correlation between the spectral encodings of the different structured elements obtained at the output of the light beam spectral encoding device 5 is sufficiently low. Nevertheless, certain configurations giving less good performance or that are versatile may be envisioned without that function. For example (see FIG. 3), it is possible to produce a projector comprising a first glass plate with faces that are planar and parallel (of which the faces are inclined relative to the axis Oy by an angle +θ around the axis (Ox)) to geometrically separate the incident rays according to their wavelength (that is to say forming the optical system for spectral decomposition 3), a multiplicative coding device 5 operative through transmission (for example an optical mask), and a second glass plate with faces that are planar and parallel (of which the faces are inclined relative to the axis Oy by an angle equal to −θ around the axis (Ox)) to spectrally recombine the incident rays (that is to say forming the optical system for spectral recombination 8).

Figure 3:
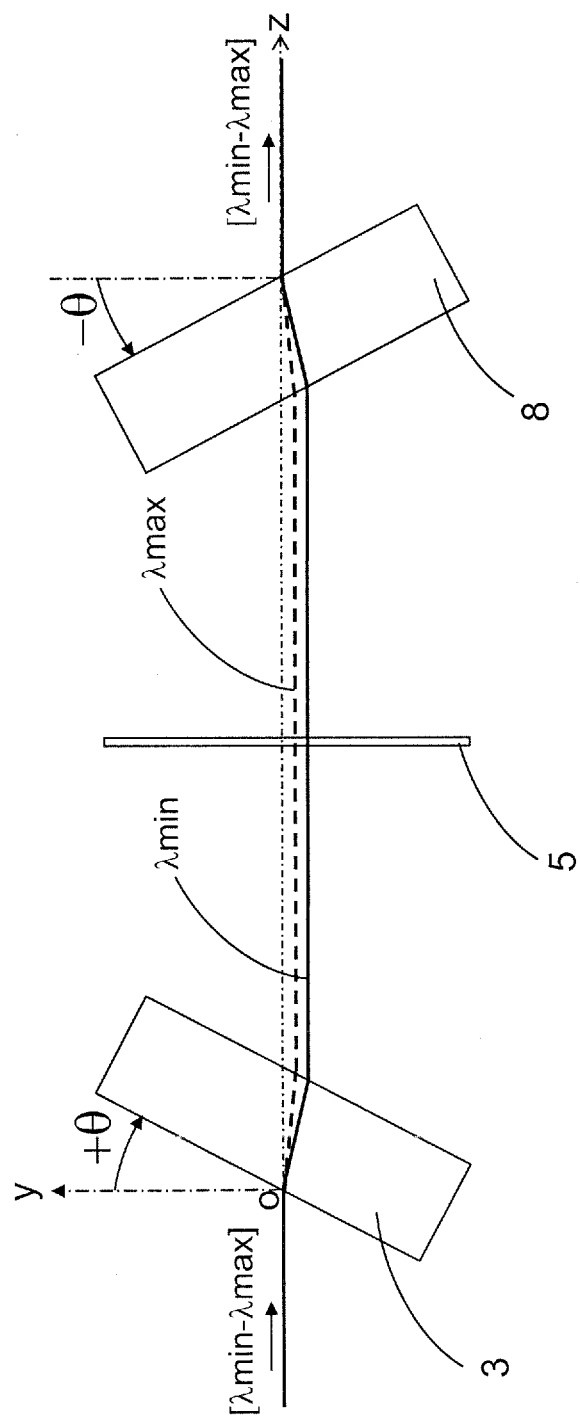
FIG. 3 diagrammatically shows an example embodiment of elements of a projector according to FIG. 1 formed by plates of glass with planar parallel faces, FIG. 4 diagrammatically shows another example embodiment of the elements of FIG. 3, FIGS. 5*a* and 5*b* respectively illustrate the propagation of the beam $F_{\lambda max}$ and of the beam $F_{\lambda min}$, respectively corresponding to the maximum wavelength ($\lambda_{max}$) and to the minimum wavelength ($\lambda_{min}$) of the incident beam.
Figure 4:
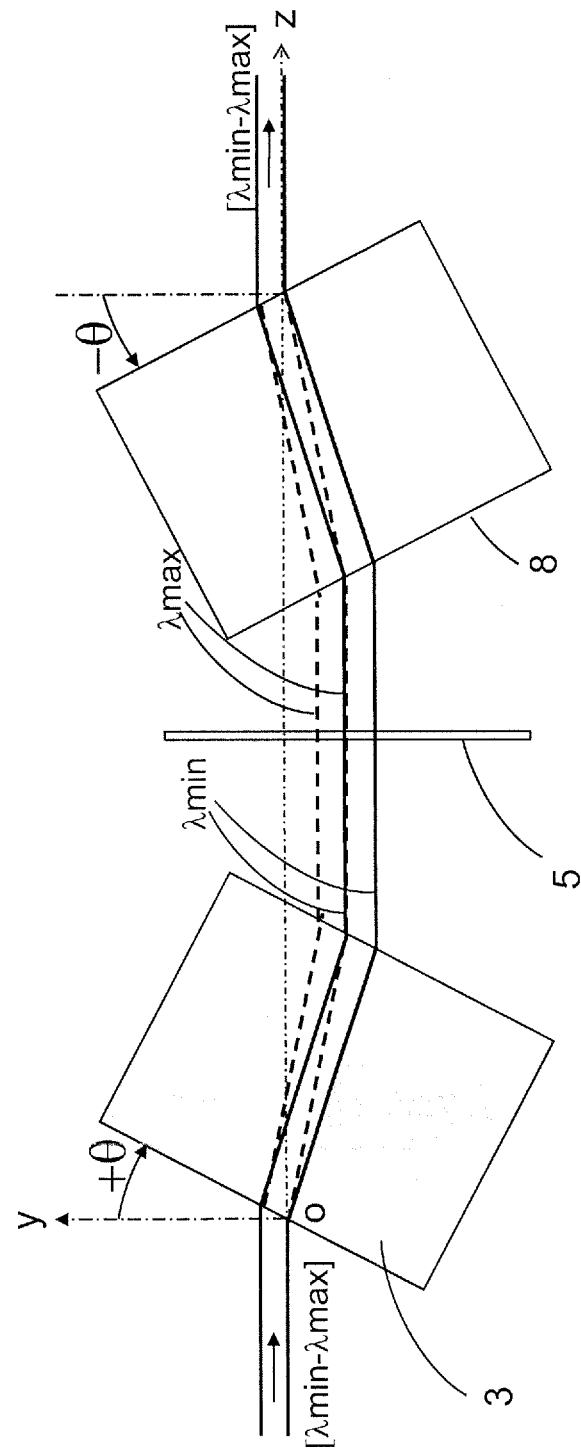

The example represented in FIG. 4 adopts the principle illustrated in FIG. 3 by detailing the paths taken by the beam of wavelength λmin and the beam of wavelength λmax in a favored configuration in which those beams are juxtaposed along a line constituting a boundary.

The light constituting the incident beam is for example polychromatic: its spectrum may be discrete (i.e. constituted by a finite number of wavelengths) or continuous. The spectral range may extend in the ultraviolet and/or visible and/or infrared domains according to the application. The beam may come from a natural source (sun, daylight, etc.) or artificial (incandescent lamp, polychromatic LED, set of several practically monochromatic LEDs, set of several diode lasers, etc.).

Figure 5A:
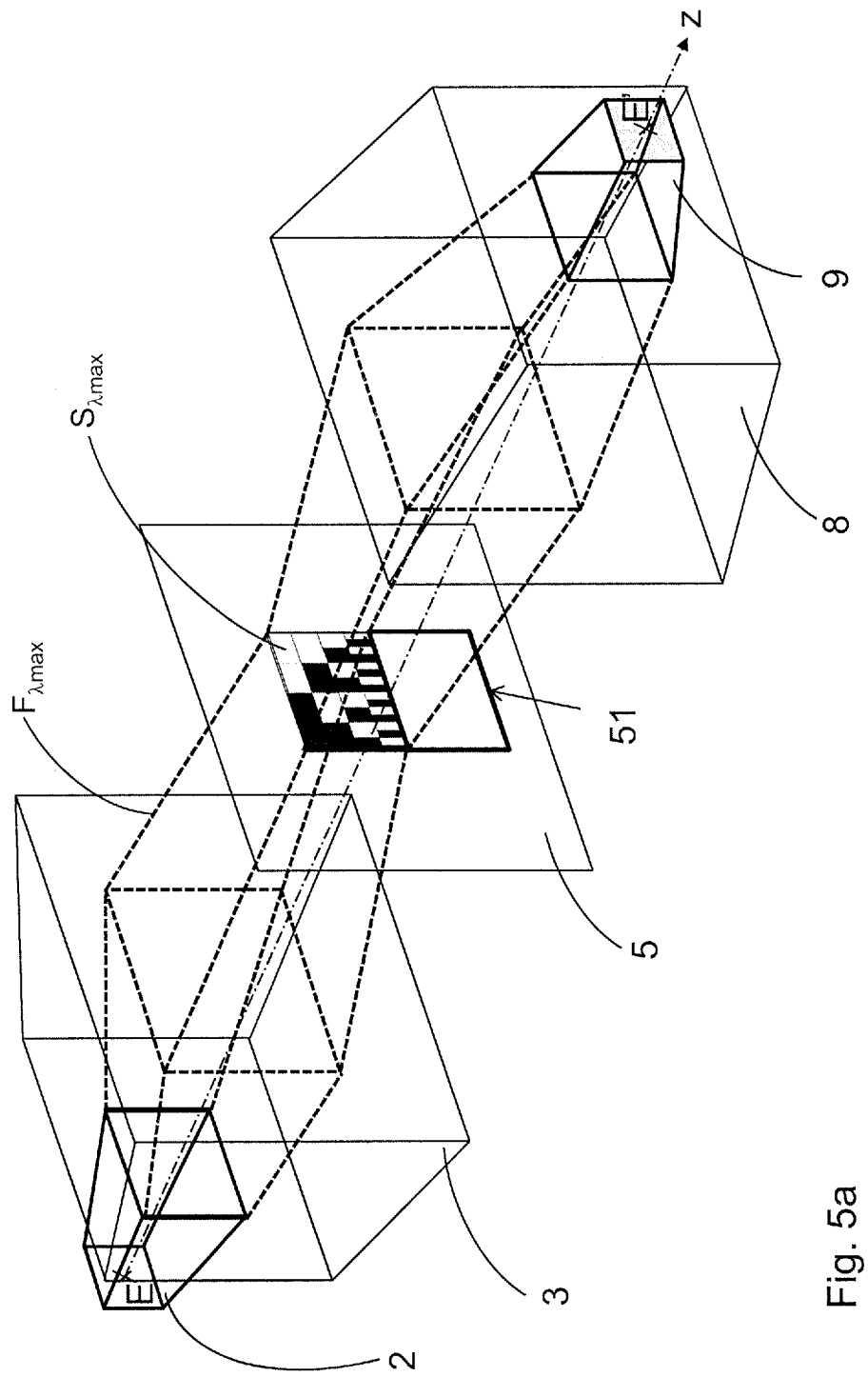
FIG. 5*c* illustrates the combined propagation of the bounding beams $F_{\lambda min}$ and $F_{\lambda max}$ and presents an example of a dual binary mask of which each sub-pattern represents the 16 binary values of a canonical basis of degree 4.
Figure 5B:
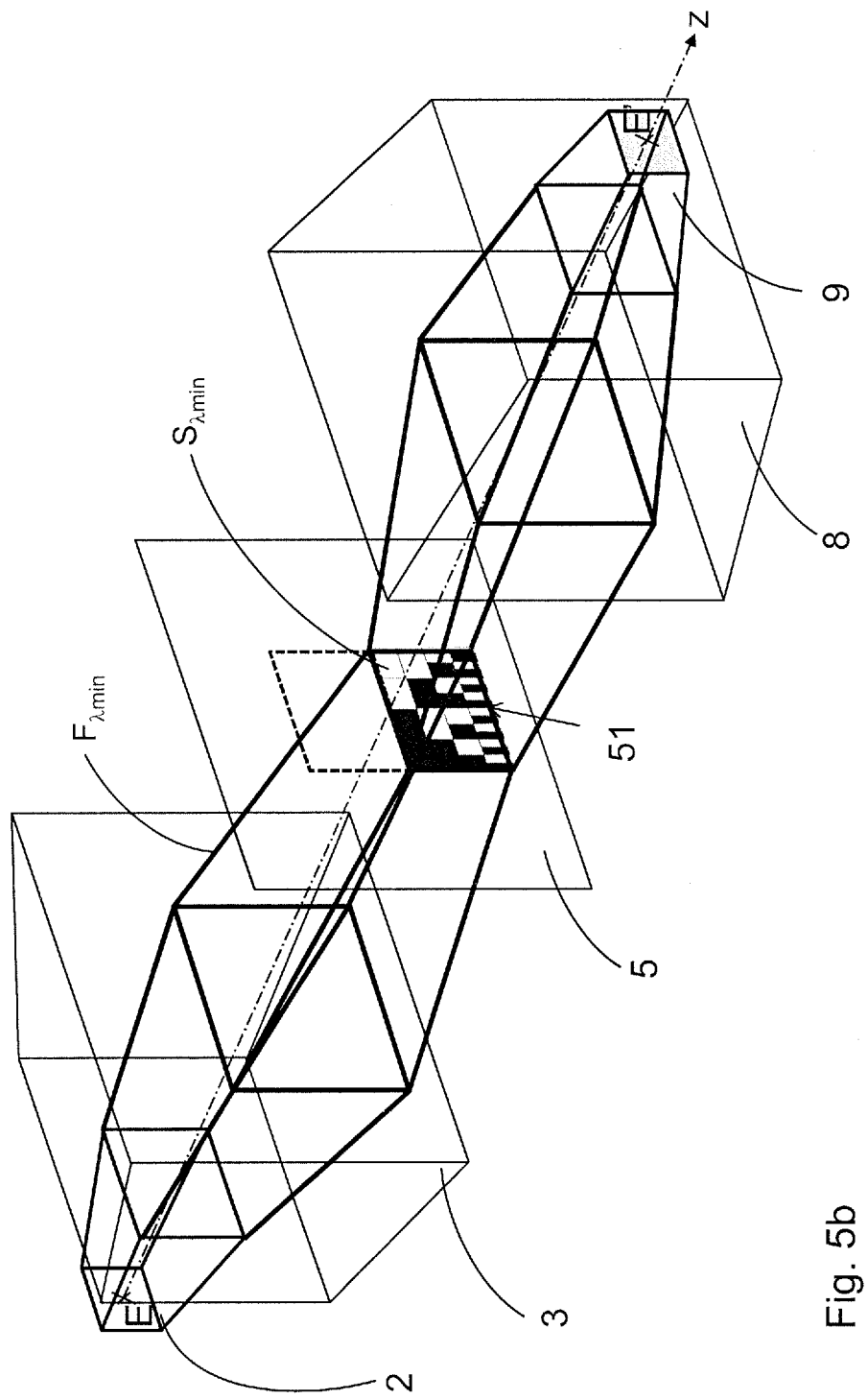

The projector is advantageously optically configured for a given range of wavelengths, here denoted [λmin-λmax]. FIGS. 5a and 5b respectively represent the optical propagation of the light within the aforementioned main optical components of the projector for the maximum wavelength (λmax) and the minimum wavelength (λmin) of the incident beam, in particular when that is embodied by the beam-former 2. In these FIG.s, the spectral dispersion of the incident rays is assumed to be a vertical angular deviation produced at the input of the optical system for spectral decomposition 3 and the image of the waist of the beam-former is formed on the multiplicative coding device 5 for example by a converging optical system (for example a lens operative in transmission or a mirror operative in reflection), for example located at the output of the optical system for spectral decomposition 3. Although in these arrangements, the spectral dispersion is carried out before the taking up of the image by the converging optical system, these two functions may also be carried out in the reverse order.

Figure 5C:
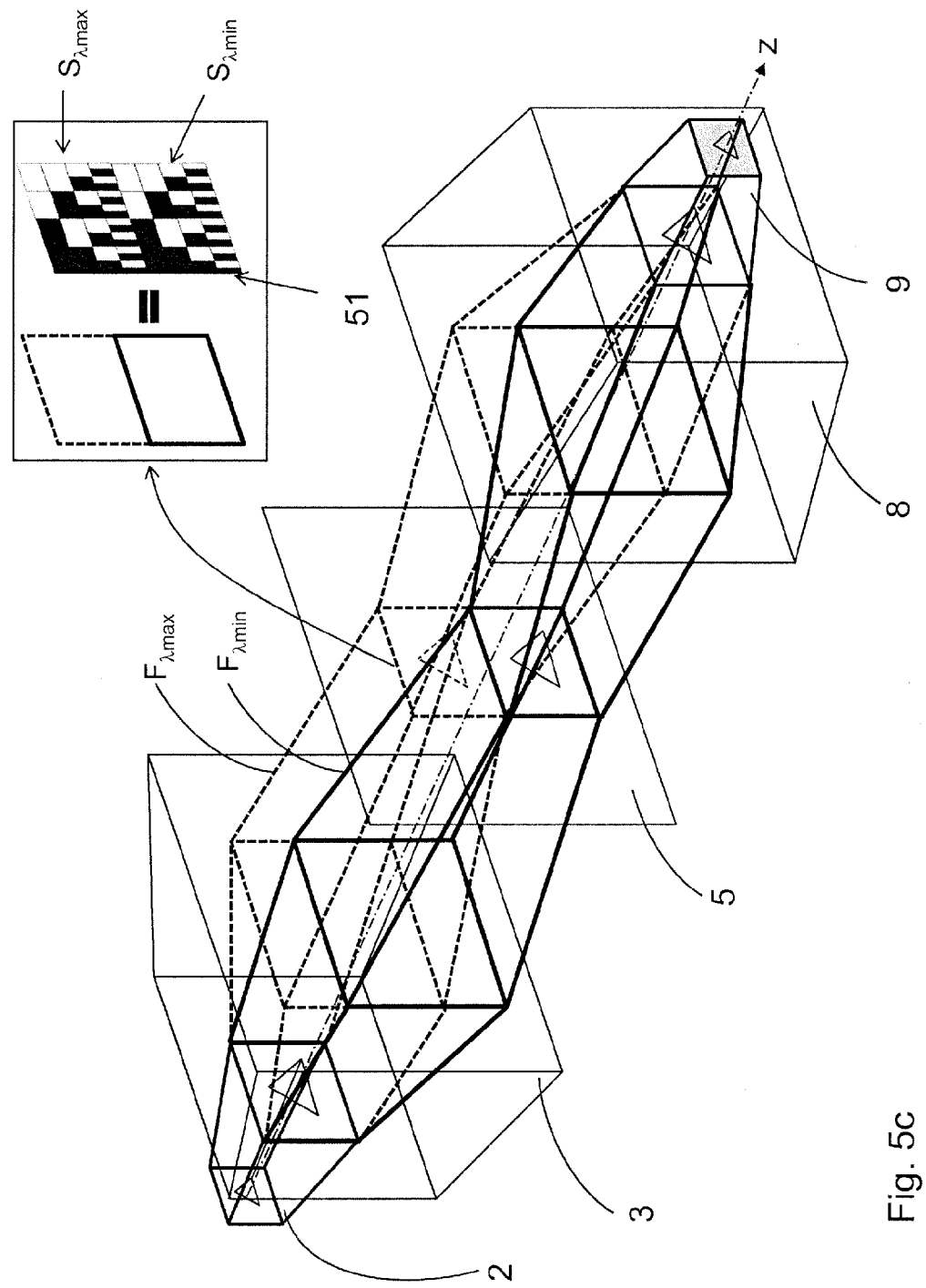
Figure 6:
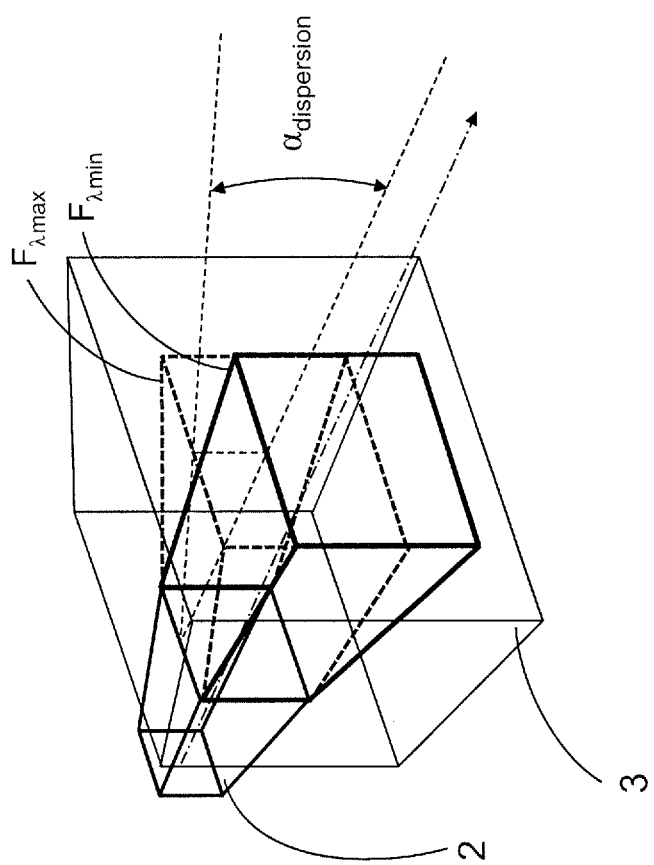
FIG. 6 presents a definition of the angle of spectral dispersion, denoted $\alpha_{dispersion}$, characterizing the spectral dispersion produced by the optical system for spectral decomposition 3.

FIG. 5c illustrates the combined propagation of these two bounding beams. The spectral dispersion angle $\alpha_{dispersion}$ made in the optical system for spectral decomposition 3 between the beams $F_{\lambda min}$ and $F_{\lambda max}$ is represented in FIG. 6. In the arrangements of FIGS. 5a, 5b and 5c, the optical characteristics of the optical system for spectral decomposition 3 are configured in order for these two bounding beams, denoted $F_{\lambda min}$ and $F_{\lambda max}$, to intersect or meet the mask of the encoding device 5 in two identical rectangular cross-sections (respectively denoted $S_{\lambda min}$ and $S_{\lambda max}$) that are juxtaposed in the direction of the spectral dispersion of the beam (in this example it is assumed that the dispersion by wavelength places $F_{\lambda min}$ at a lower vertical position that that of $F_{\lambda max}$). This condition, referred to as juxtaposition below, is the preferred configuration of the invention but the invention also applies if the intersection zones overlap partially or are away from each other. When the intersection zones partially overlap, the rate of correlation between the spectral encodings contained in the light beam output from the projector is higher than in the case of the juxtaposition of those two zones. The richness of the spectral encoding reduces with the increase in that correlation rate. For example, in an extreme case in which the angular deviation of the incident rays in the optical system for spectral decomposition 3 is not dependent on the wavelength, the intersection zones totally overlap and each spectral channel passes through ("sees") the same zone of the multiplicative coding device 5. Each spectral channel is thus encoded by the same information and the rate of correlation is equal to 1. Lastly, when the intersection zones are away from each other, the encoding richness of the spectral encoding may be kept by adapting the pattern for multiplicative coding to the geometry of the figure of light obtained on the multiplicative coding device 5. Such a configuration however renders the interpretation of the measurements more difficult.

When the incident beam is that embodied by the beam-former 2, the entirety of the incident light is encoded and the total field of encoding of the system is used. In other situations:

Either the incident beam is fully encoded: this is the case for example for an input beam 1 defined in FIGS. 7a and 7b (and of which the optical path is apparent in FIG. 5c) for which:

A cross-section $S_{beam-example}$ at point E is included in the cross-section $S_{beam-former}$ of the beam-former 2, and the angular openings $\alpha_{beam-example}$ and $\beta_{beam-example}$ in both directions Oy and Ox are respectively smaller than the angular openings $\alpha_{beam-former}$ and $\beta_{beam-former}$ of the beam-former 2.

Or else part only of the incident beam is encoded since certain rays are physically diaphragmed, or the incident beam is geometrically delimited, either upstream of the optical system for spectral decomposition 3 (which situation would then be analogous to that of a beam-former) or by the encoding device 5 itself, for example if an image on the mask is larger than the area of the mask. For example, in the case of an incident beam enveloping the beam-former 2, only the fraction of the incident beam corresponding to that former would be encoded.

In the theoretical diagrams of FIGS. 5a, 5b and 5c, the optical system for spectral recombination 8 making it possible to spectrally "recombine" the light beam, fully compensates for the spectral dispersion of the incident rays initially produced by the optical system for spectral decomposition 3: the beams $F_{\lambda min}$ and $F_{\lambda max}$ in fact fully recombine. In the example embodiment represented in these Figures, the spectral recombination is carried out before the image is taken up by a converging optical system but these two functions may also be carried out in the reverse order. The output beam 9 obtained as output from the optical system for spectral recombination 8 is centered on the optical axis of the latter (here the same axis (Oz)) and focuses at a given position on that axis. Its cross-section, here also rectangular, $S'_{beam-former}$ (shown in diagram form in FIG. 1 in particular) is substantially perpendicular to the optical axis, and its focal point is denoted E' (also represented in FIG. 1 in particular). The planes of the cross-sections $S_{beam-former}$ and $S'_{beam-former}$ are optically conjugated by the elements of the projector situated between them. In these FIG.s, the image $S'_{beam-former}$ of the cross-section $S_{beam-former}$ is formed in a real image space of the optical system for spectral recombination 8, but it is possible to form it in the imaginary image space (by a suitable choice of the elements of the optical system for spectral recombination 8) if the application requires it.

An example of a mask 51 of the multiplicative coding device 5 is represented at the location of these two cross-sections $S_{\lambda min}$ and $S_{\lambda max}$ in FIGS. 5a, 5b and 5c: here it is a binary encoding mask for which the black zones of the mask represent the parts opaque to light (in the case of a mask operating through transmission; these zones correspond to absorbent zones in a case of a mask operating through reflection), equivalent to the multiplicative value 0 of the light stream passing through it, and the white zones represent the transparent parts (in the case of a mask operating through transmission; these zones correspond to reflective zones in the case of masking operating through reflection), equivalent to the multiplicative value 1. The mask 51 is constituted by rows and columns, in particular here the basic pattern, or sub-pattern, comprises m=16 columns and n=4 rows by way of example: the columns of the mask are oriented in the direction linked to the spectral dispersion of the beam, i.e. the vertical direction in these Figures (i.e. the axis (Oy)), and the rows are perpendicular to the direction of the columns, i.e. here oriented in the horizontal transverse direction (i.e. the axis (Ox)). In the case of this example, the mask 51 encodes both beams $F_{\lambda min}$ and $F_{\lambda max}$ identically. This encoding example thus presents a repetition of a basic pattern (the upper half or the lower half of the mask) in the direction associated with the spectral dispersion of the beam: in this document, reference is for example made to this particular type of encoding under the designation "dual coding" or "dual masking". The basic pattern of the dual mask here contains 16 binary values with a canonical basis of degree 4, here classified in increasing order from left to right in FIGS. 5a, 5b and 5c (that is to say for each column from the left according to the rows starting with that at the top for example: 0000, 0001, 0010, . . . , 1111), of which the 4 bits are respectively associated with the four rows of the pattern.

The operating principle of the multiplicative coding device 5 is presented in FIGS. 8 to 13 on the basis of this coding pattern example. Furthermore, to simplify the explanations and to lighten the mathematical formulation of the spectral encoding of the beam, the enlargement of the optical system for spectral decomposition 3 and that of the optical system for spectral recombination 8 are positive here and equal to 1 (as represented in FIG. 8), and the optical transmissions of these two devices are equal to 1 over all their useful optical fields. The variation in these enlargements and the optical transmissions with the wavelength are also ignored. For the same reasons, the angular deviation produced by the optical system for spectral decomposition 3 is assumed to be linear with the wavelength and the angle $\alpha_{dispersion}$ of spectral dispersion produced between the beams $F_{\lambda min}$ and $F_{\lambda max}$ is considered as being sufficiently low to express the mathematical formulation of the spectral encoding of the beam in the context of small angle approximation (i.e. it is possible to assume that $\tan(\alpha_{dispersion}) \approx \alpha_{dispersion}$). The assumption of linearity of the deviation with the wavelength and the small angle approximation enable it to be considered that the light beam intersects, encounters, the plane of the mask 51 with a rectangular cross-section of which the position varies linearly according to the wavelength between the position $S_{\lambda min}$ and the position $S_{\lambda max}$. Nevertheless, the present invention also applies if these optical transmissions and enlargements are different from 1, if the angular deviation produced by the optical system for spectral decomposition 3 is non-linear with the wavelength (for example in the case of an optical prism) and if the angle $\alpha_{dispersion}$ is great.

The spectral luminances of the images formed at the location of the cross-sections $S_{beam-former}$ and $S'_{beam-former}$ are respectively denoted $F(x_n, y_n, \lambda_n)$ et $F'(x'_n, y'_n, \lambda_n)$ in FIG. 8. In this formulation, $\lambda_n$ is the normalized value of the wavelength: $\lambda_n = (\lambda - \lambda \min)/(\lambda \max - \lambda \min)$ with $\lambda \min \leq \lambda \leq \lambda \max$. In similar manner, $(x_n, y_n)$ and $(x'_n, y'_n)$ are the normalized values of the coordinates of the points located on the cross-sections $S_{beam-former}$ and $S'_{beam-former}$ respectively (as represented in FIG. 8). Lastly, the multiplicative function (comprised between 0 and 1) of the multiplicative coding device 5 is denoted $M(x''_n, y''_n)$ in FIG. 8, with $(x''_n, y''_n)$ being the normalized values of the coordinates of the points located in the useful coding zone (which is a rectangular zone represented in dashed line in FIG. 8) that is to say of the mask. The position of the light beam in the useful coding zone is represented in this FIG. for three values of wavelength: $\lambda=\lambda\min$ (case of FIG. 5b), $\lambda=\lambda\max$ (case of FIG. 5a) and the case in which $\lambda\min<\lambda<\lambda\max$, that is to say for an arbitrary value of wavelength $\lambda$ of the incident beam comprised between those bounds.

Figure 9:
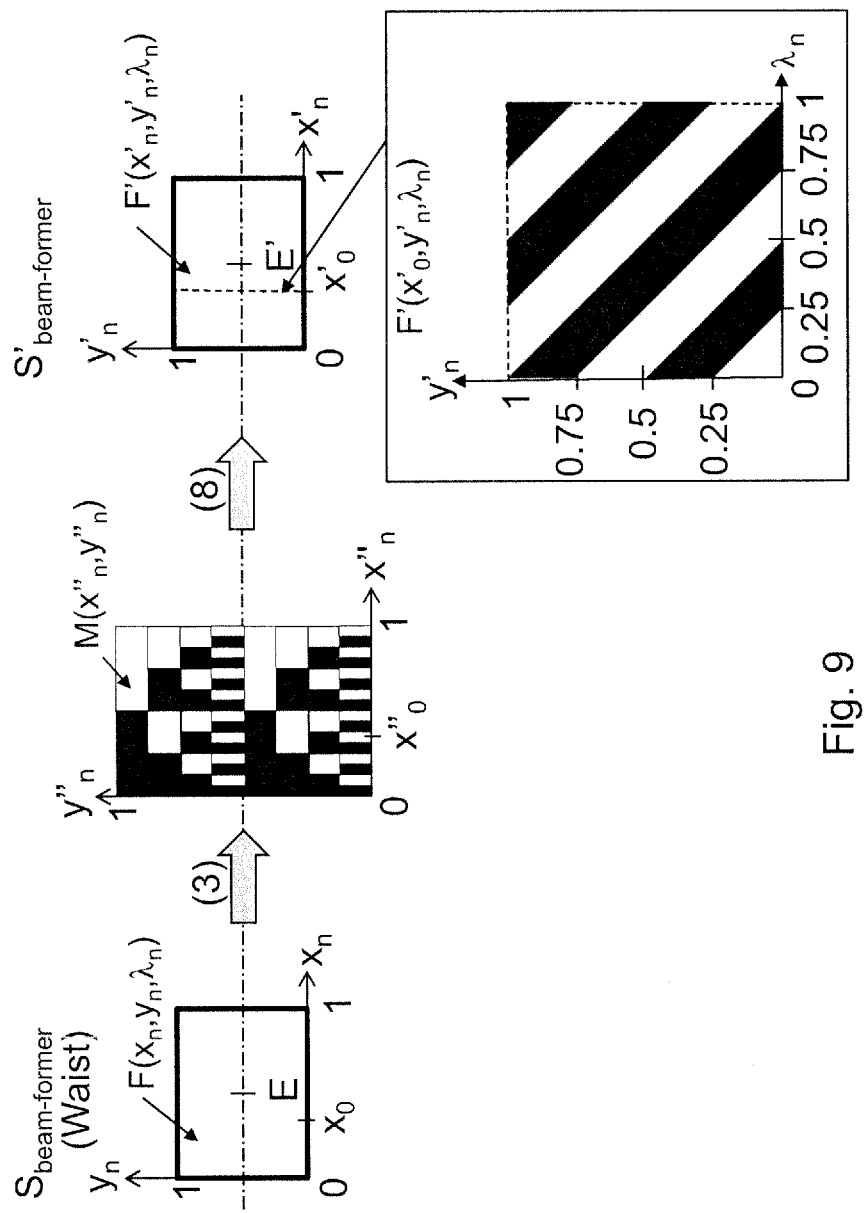
FIG. 9 illustrates a spectral encoding device obtained along a line of an image obtained at the output of the optical system for spectral recombination according to the mask example of FIG. 5*c*.

With these assumptions and notations, the image of a point $(x_n, y_n)$ of the cross-section $S_{beam-former}$ forms at the point $(x'_n=x_n, y'_n=y_n)$ of the cross-section $S'_{beam-former}$ and the luminance $F'(x'_n, y'_n, \lambda_n)$ of the image obtained as output is proportional to the product $F(x_n, y_n, \lambda_n) \times M(x_n, (y_n + \lambda_n)/2)$, in which $F(x_n, y_n, \lambda_n)$ is the luminance of the beam at the cross-section $S_{beam-former}$. This product constitutes the formulation of the spectral encoding of the beam. This spectral encoding is illustrated in FIG. 9 along an x-coordinate row $x'_0$ (corresponding for example to the $6^{th}$ column of the dual binary mask) of the image obtained as output from the optical system for spectral recombination: the function $F'(x'_0, y'_n, \lambda_n)$ represents the spectral content of the light beam along that row (to limit the graphical representation to the physical phenomenon to illustrate, the function $F'(x'_0, y'_n, \lambda_n)$ is represented assuming that the function $F(x_n, y_n, \lambda_n)$ is constant at every point of the cross-section $S_{beam-former}$ and over the wavelength range [$\lambda\min, \lambda\max$]).

Figures 10, 11:
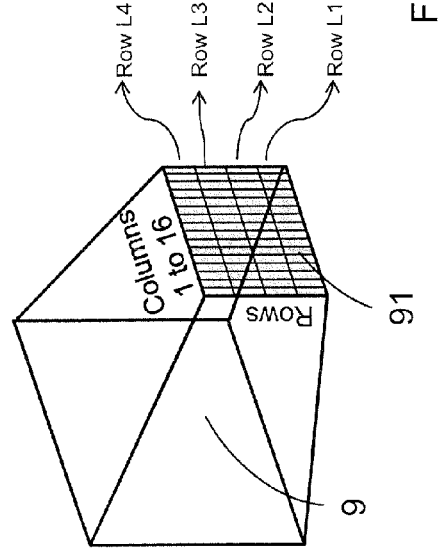
FIG. 10 shows the zones of the mask illuminated by five light beams of the incident beam of different wavelengths in an example in which the incident beam comprises five monochrome wavelengths.
FIG. 11 is a diagrammatic representation of the output image of the optical system for spectral recombination of the example of FIG. 10.
Figures 12, 13:
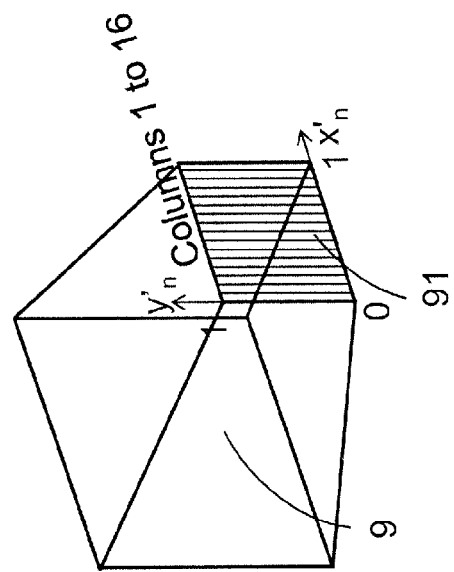
FIG. 12 presents zones of the mask illuminated by four channels in an example in which the optical spectrum of the incident light beam is continuous.
FIG. 13 is a diagrammatic representation of the output image of the optical system for spectral recombination of the example of FIG. 12.

FIGS. 10 to 13 represent graphical illustrations of the optical process of the encoding. In the case of FIGS. 10 and 11, the light spectrum of the incident beam is here considered as constituted by five wavelengths $\lambda_1 (=\lambda\min)$, $\lambda_2$, $\lambda_3$, $\lambda_4$ and $\lambda_5 (=\lambda\max)$ and the optical system for spectral decomposition 3 is configured to geometrically separate the incident rays in the following manner:

the beam $F_1 (=F_{\lambda min})$ of wavelength $\lambda_1 (=\lambda\min)$ illuminates (that is to say passes through in the case of a mask operating through transmission or is reflected in the case of a mask operating through reflection) the lower half of the dual mask (as in FIGS. 5b and 5c), i.e. the rows No. 1 to No. 4 if the rows are numbered from 1 to 8=2*n, here in the direction (Oy), the beam $F_2$ of wavelength $\lambda_2$ traverses the rows No. 2 to No. 5 of the dual mask, the beam $F_3$ of wavelength $\lambda_3$ traverses the rows No. 3 to No. 6 of the dual mask, the beam $F_4$ of wavelength $\lambda_4$ traverses the rows No. 4 to No. 7 of the dual mask, and the beam $F_5 (=F_{\lambda max})$ of wavelength $\lambda_5 (=\lambda\max)$ traverses the rows No. 5 to No. 8, that is to say the upper half of the dual mask (as in FIGS. 5a and 5c).

The zones of the dual coding mask respectively traversed by the beams $F_1$ to $F_5$ are represented in FIG. 10 (zones outside the hatched parts). The image 91 formed at the location of cross-section $S'_{beam-former}$ of the output beam 9 (see FIG. 11) contains 4 rows, denoted L1 to L4, of 16 pixels (this is the segmentation produced by the basic pattern of the dual mask) forming the m=16 columns. This image is constituted by the combination of the five beams $F_1$ to $F_5$, each having been encoded by the zone of the dual mask which it traversed. If, in each pixel of that image, consideration is made of the binary value with 5 bits that is associated with the presence or absence of a wavelength in the respective order $\lambda_5\ \lambda_4\ \lambda_3\ \lambda_2\ (\lambda_1)$, the table of values placed to the right in FIG. 11 is obtained. The last bit, corresponding to ($\lambda_1$) is between brackets since it is always equal here to the first bit, corresponding to ($\lambda_5$) (the beams $F_1$ and $F_5$ traversing zones of the mask which are identical here). By omitting the bit 5 which is between brackets, each of the rows L1 to L4 contains all the numbers, 0000 to 1111, of the binary canonical basis of degree 4.

Considering the more general case in which the light spectrum constituting the incident beam is continuous (see FIGS. 12 and 13), and assuming that this spectrum encompasses the spectral range [$\lambda\min-\lambda\max$], it is the configuration of the basic pattern of the mask which makes it possible to set the number and spectral widths of the spectral channels constituting the spectral basis for the encoding. In the context of the present example of a dual binary mask, the mask naturally "cuts up" four spectrally contiguous spectral channels here denoted C1 to C4, of which the ranges of wavelengths are [$\lambda_1-\lambda_2$], [$\lambda_2-\lambda_3$], [$\lambda_3-\lambda_4$] and [$\lambda_4-\lambda_5$] respectively (with $\lambda_1=\lambda\min$ and $\lambda_5=\lambda\max$) and of which the optical properties are the following:

the beam $G_1$ associated with the channel C1=[$\lambda_1-\lambda_2$] of wavelengths illuminates the rows No. 1 to No. 5 of the dual mask.

the beam $G_2$ associated with the channel C2=[$\lambda_2-\lambda_3$] of wavelengths illuminates the rows No. 2 to No. 6 of the dual mask.

the beam $G_3$ associated with the channel C3=[$\lambda_3-\lambda_4$] of wavelengths illuminates the rows No. 3 to No. 7 of the dual mask, and the beam $G_4$ associated with the channel C4=[$\lambda_4-\lambda_5$] of wavelengths illuminates the rows No. 4 to No. 8 of the dual mask.

The image 91 formed at the location of the cross-section $S'_{beam-former}$ of the output beam 9 (see FIG. 13) is still segmented into 16 columns as in the case of the image (FIG. 11) produced by the incident light beams of which the light spectrum was constituted by five discrete wavelengths $\lambda_1$ to $\lambda_5$, however, the segmentation by row is no longer present since the spectral content of the light in that image follows a variation along the vertical axis (illustrated in FIG. 9 at a given x-coordinate position $x'_0$) described by the formulation of the spectral encoding of the beam referred to previously. In this example, the number of spectral channels for coding may thus be increased or reduced by simply modifying the number of rows of the basic pattern of the dual mask. For example, if the basic pattern of the dual binary mask contains 10 rows (that is to say n=10 instead of n=4 in the present represented example) and represents the canonical basis of degree 10, the number of spectral channels would be 10. Similarly, by selecting different heights of rows in the basic pattern, it is possible to maintain the number of spectral channels while changing their spectral widths or to compensate for a non-linear spectral dispersion. For example, if row No. 1 of the dual mask (thus also row No. 5) is wider, and row No. 2 (thus also row No. 6) is proportionally narrower to leave the total height of the dual mask unchanged, the new wavelength $\lambda_{2bis}$ is then greater than the old wavelength $\lambda_2$, the wavelengths $\lambda_1$, $\lambda_3$, $\lambda_4$ and $\lambda_5$ remain unchanged and, therefore, the new channel $C_{1bis}$ is wider than the old channel $C_1$, and the new channel $C_{2bis}$ is narrower than the preceding channel $C_2$, whereas channels $C_3$ and $C_4$ remain identical.

The dual mask represented in the present example of the light beam spectral encoding device 5 and which is shown in diagram form in FIGS. 5a, 5b, 5c, 9, 10 and 12 also presupposes that the optical system for spectral decomposition 3 of this example operates in linear approximation with regard to dispersion, as mentioned earlier: the dispersion angle, for a given wavelength, is in fact assumed to be constant in the optical field of the beam-former 2, that is to say that it does not vary with the direction of the incident ray. In case of non-linearity of this dispersion, a possible solution is to design the coding pattern of the mask on the basis of the linear pattern represented here by applying thereto a geometrical deformation compensating for the effects of the that non-linearity on the form of the figure of light obtained on the multiplicative coding device 5.

Thus, the encoding principle is illustrated here by utilizing the example of a binary mask, but a more complex spectral coding of the light beams, for example with a non-binary multiplicative mask (with more than two levels), that is to say of which the values cover grayscales between 0 (total opacity to light) and 1 (total transparency) would also be possible to envision.

Lastly, in the example illustrated in the diagrams of FIGS. 5a, 5b and 5c the optical system for spectral recombination 8 makes it possible to spectrally "recombine" the light beams by fully compensating for the geometrical separation of the incident rays which was produced by the optical system for spectral decomposition 3 according to the wavelengths. This is the preferred configuration of the present invention since it ensures optimal spectral encoding in terms of encoding richness and light throughput for encoding. However, the present invention also applies to the case in which the compensation is partial, but in this case, the spectral encoding richness is a maximum only over the zone of the output image in which all the wavelengths of the spectral range [$\lambda$min-$\lambda$max] are superposed. The light located outside that zone, which is not constituted by all the wavelengths of the incident beam, is not spectrally encoded over the entirety of the spectral range [$\lambda$min-$\lambda$max]. Furthermore, the light level is less in that zone than in that in which all the wavelengths of the spectral range [$\lambda$min-$\lambda$max] are superposed.

The total repetition of the basic pattern is the preferred configuration of the present invention, but the invention also applies if the repetition is partial or possibly if there is no repetition at all.

Figure 14:
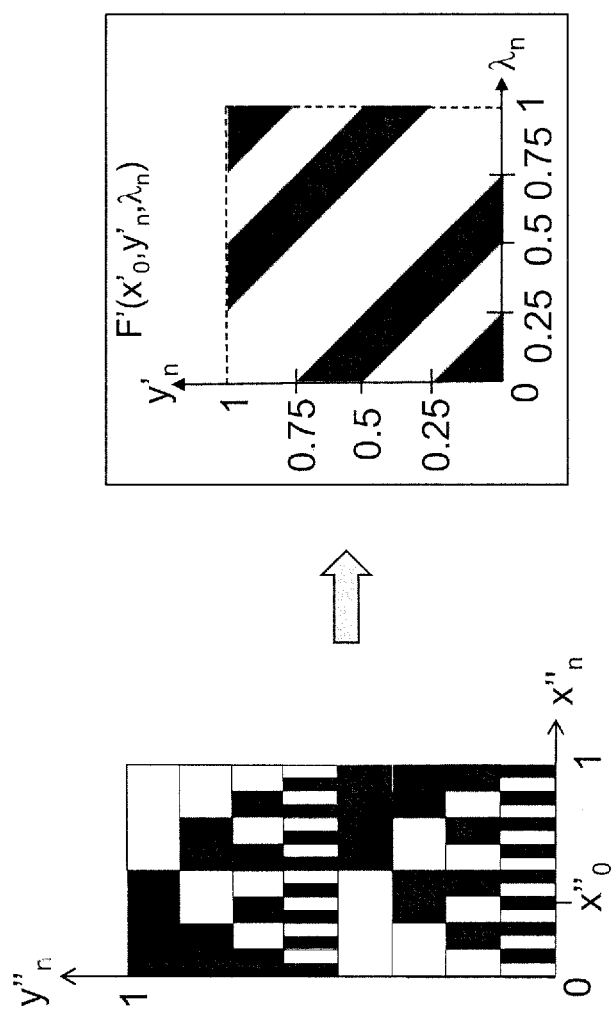
FIG. 14 shows another example of a coding pattern of the mask and a representation of the spectral encoding obtained along a line in the output image.

Numerous possible patterns may be chosen so as to ensure a sufficiently high spectral encoding richness. For example, it is possible to use a pattern constituted by the basic pattern of the dual binary mask of FIG. 10 and a complementary pattern, as is for example represented in FIG. 14. In this case, the encoding richness remains as high as with the dual binary mask of FIG. 10, as illustrates the new function $F'(x'_0, y'_n, \lambda_n)$ obtained, also represented in FIG. 14.

Figure 15:
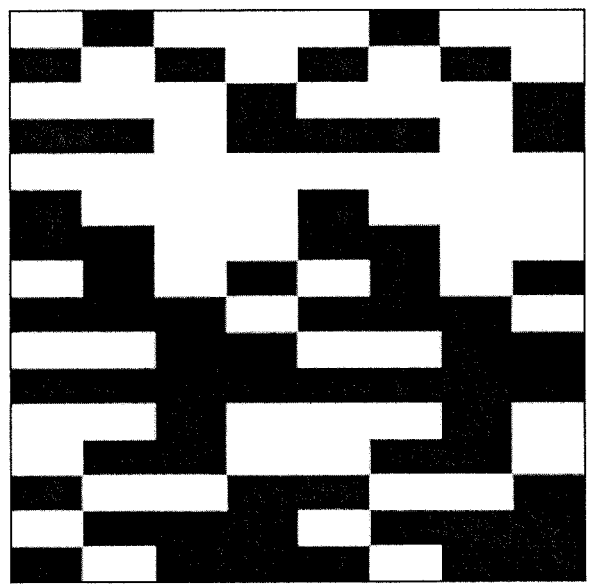
FIG. 15 illustrates a binary mask example of which the columns have been mixed.

Another mask example is represented in FIG. 15. Such a mask corresponds to the mask previously represented of which the columns have been mixed. Thus, all the columns are still different from each other, which is a preferred mask configuration in the context of the present invention.

As a matter of fact, a column repetition may be envisioned but this has the drawback of increasing the ambiguity which then complicates the reconstruction algorithm.

Lastly, more generally, it is also possible to use a coding pattern which is not arranged in rows and columns (for example a pattern of any known content). In this case, the segmentation into spectral channels is not induced by the coding pattern itself, but may be carried out by the detection device (for example a multi-spectral camera) of the system in which is used the device for spectral encoding of light beams.

In the context of the use of the present invention in the field of what are referred to as "structured-light" three-dimensional scanners, a projector of spectrally structured light comprises an optical coupling between a light source, for example such as described above, positioned at the input of the projector and a projection optical system configured to project the image produced on a scene to observe. For example, in the case of the use of the dual binary mask of FIG. 10 and if the spectrum of the light constituting the incident beam is continuous over a range of wavelengths between at least $\lambda$min and $\lambda$max, the projected pattern is constituted by multiple spectrally structured light bands of which the correlation rate between the spectral encodings of the different light bands is sufficiently low to be able to easily distinguish the bands from each other. Furthermore, for a number of rows "n" of the basic pattern of the dual mask (considering that the spectrum of the light source employed is continuous), the number of spectral channels is equal to "n" and the image produced by the projector is segmented into $2^n$ structured light bands. In practice, with such a mask, to produce sufficient accuracy on the depth map of the scene, the number n of rows of the basic pattern is preferably a minimum of 4, or even better at least 5, and advantageously greater than or equal to 7, for example comprised between 7 and 14.

Figure 16:
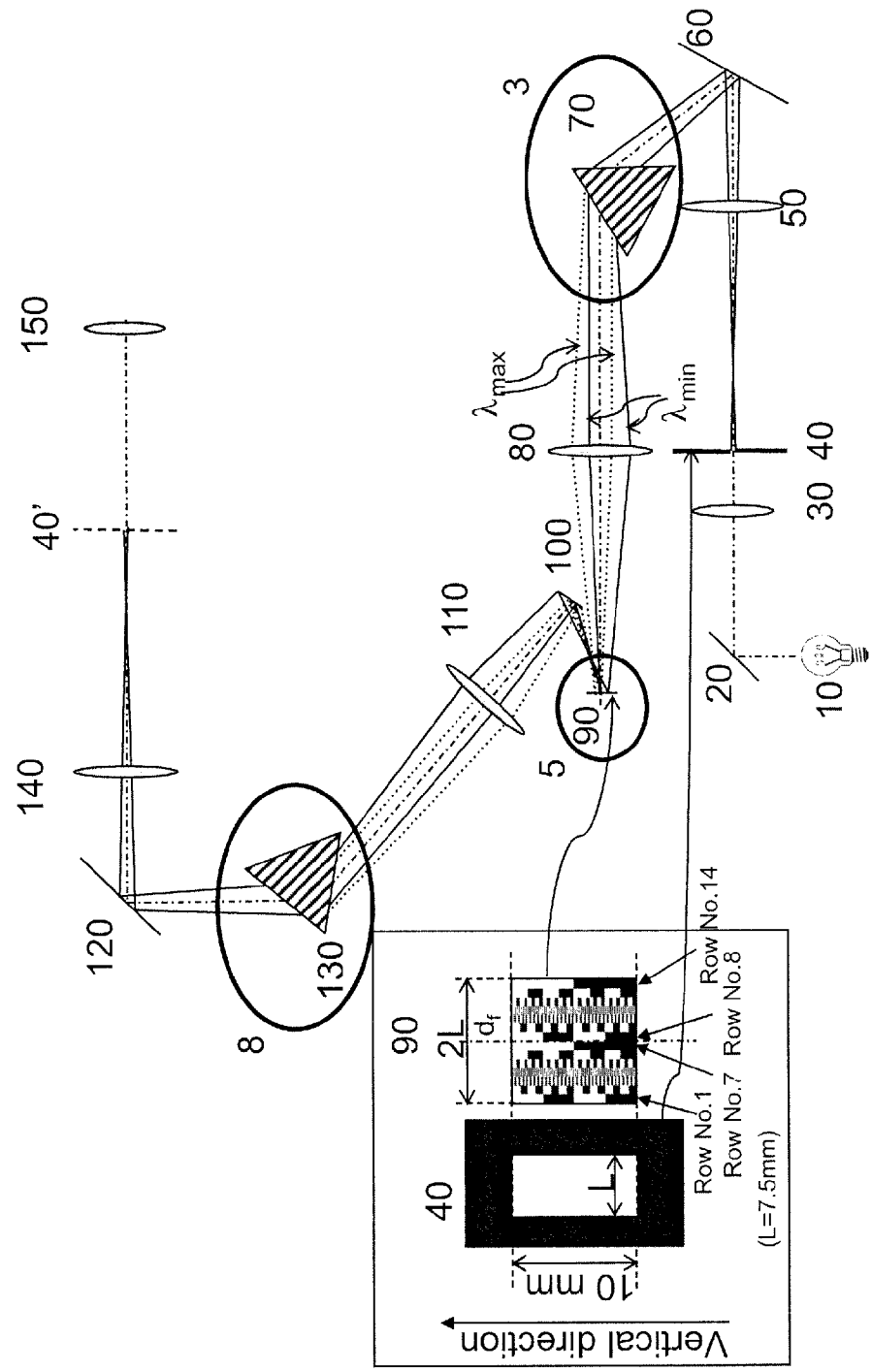
FIG. 16 presents a projector according to an example embodiment of the present invention, FIG. 17 diagrammatically presents a structured-light three-dimensional scanner according to an example embodiment of the present invention, and FIG. 18, formed from FIGS. 18*a* to 18*d*, shows images of zones of the mask observed by a multi-spectral camera in the different spectral channels of the projected image according to an example embodiment of the present invention.

FIG. 16 diagrammatically presents the structure of a projector according to an example embodiment of the present invention.

In this example, the projector of spectrally structured light is represented in a view from above, for example as if it was placed on a laboratory optical table. The projector would thus be disposed horizontally.

The projector comprises for example here in series a light source 10, an optical system for spectral decomposition 3, an encoding device 5, an optical system for spectral recombination 8 and an optical system for projection 150.

The light source 10 for example comprises an incandescent lamp, for example of the trademark Osram (model ECL-669-BO, power 210 W).

For convenience, in particular to make the projector more compact, the projector here comprises a planar mirror for specular reflection 20. It further comprises here an optical condenser 30 to optimize the quantity of light collected from the source, and, optionally, a diaphragm 40 to facilitate the adjustments and/or to geometrically delimit the beam. Here, the condenser 30 is configured to concentrate the light onto the diaphragm 40, which is for example of metal. The dimensions of its opening are for example here 10×7.5 mm² (height×width). These elements are of course optional and independent in that it is possible for only some of them to be present. These three elements presented here are for example disposed in series between the light source 10 and the optical system for spectral decomposition 3. The rectangular opening of the diaphragm 40 makes it possible to materialize the cross-section $S_{beam-former}$ already described according to an example embodiment.

The lamp of the light source 10 and the condenser 30 are for example those of a video projector of the trademark ACER (registered trademark), model X1173a DLP.

The optical system for spectral decomposition 3 comprises for example here a prism 70. The prism 70 here is configured to spectrally and angularly disperse the beam which reaches it.

The prism 70 is for example of Crown LaK10 glass (Schott) with an angle of 60°. In the example embodiment shown in diagram form in FIG. 16, its input face is for example oriented at 25° relative to the axis of the incident beam which reaches it.

Furthermore, in the present example embodiment, the projector comprises an objective 50, which for example comprises a converging lens, and a planar mirror 60, disposed between the diaphragm 40 and the optical system for spectral decomposition.

In the present example, the image of the diaphragm 40 is formed at infinity using the objective 50. For example the diaphragm is positioned at the object focus of the objective 50. The planar mirror 60, which makes it possible to improve the compactness of the device, then directs the beam towards the prism 70. In this example, the normal to the mirror is directed at approximately 26° relative to the axis of the incident beam.

Furthermore, the projector comprises an objective 80, here disposed between the optical system for spectral decomposition 3 and the encoding device 5, which is configured to focus the light dispersed by thy optical system for spectral decomposition 3, in a given plane where the encoding device 5 is positioned.

The aforementioned plane is thus for example situated at the location of the image focus of the objective 80.

It is possible for the objectives 50 and 80 to be identical. They are for example of Clairaut type, of digital f-number f/3 and focal length 150 mm.

The multiplicative coding device 5, also occasionally designated here as multiplicative coding device, may operate through reflection or transmission. Here, it operates through reflection. This makes it possible for example to make the device more compact.

The encoding device 5 comprises a mask 90 which is for example here formed by a DMD cell. The DMD cell is for example a DMD cell of the trademark Texas-Instrument, with dimensions of the useful optical field height×width of 10×15 mm², and SVGA resolution 800×600.

The DMD cell is positioned perpendicularly to the average axis of the incident beam and oriented such that its height h (10 mm) is parallel to the length (approximately 10 mm) of the image of the diaphragm on the DMD cell and such that its width (15 mm) is oriented in the direction linked to the spectral dispersion of the light source.

The mask 90 used is what is referred to as "dual", such as described above, of which the repetition is made in the direction linked to the spectral dispersion direction, that is to say in the horizontal direction that is transverse to the incident beam in this example embodiment. In other words, in this example embodiment the "rows" of the mask 90 are successive to each other in the horizontal direction whereas the "columns" of the mask are successive to each other in the vertical direction.

The mask 90 is furthermore configured such that its width (2*L), that is to say its dimension taken according to the dispersion of the beam, is equal to twice the width L of the diaphragm 40 whereas its height is equal to that of the diaphragm 40.

By way of example, the mask 90 represented on the left of FIG. 16 is a dual mask that is binary, which is to say black (absorbing the light) or white (reflecting the light in case of operation through reflection) depending on the zone (which here corresponds respectively to the minimum or maximum value of the range of controlling values of the DMD cell).

In the context of the use of a DMD cell, this dual coding pattern is for example the image displayed on the DMD cell via a computer connected to the projector.

This mask comprises a pattern formed from a series of 2*n rows with n=7, and comprising m=2^7=128 columns. In other words, the coding is thus carried out over n=7 contiguous spectral channels; called $C_1$ to $C_7$, extending by way of example here from λmin=400 nm to λmax=680 nm, which makes it possible to spectrally encode 2^7=128 horizontal light bands. Furthermore, given the possible non-linearity of the deviation angle of the prism 70 used here according to the wavelength, the aforementioned spectral channels $C_1$ to $C_7$ may differ in spectral width: the spectral ranges (in mm) of the spectral channels $C_1$ to $C_7$ are for example here [400-419], [419-442], [442-470], [470-504], [504-547], [547-603] and [603-680] respectively.

Rows No. 1 to No. 7, corresponding to the left half of the mask represented in FIG. 16 which forms a first sub-pattern, would then be illuminated by the beam of wavelength λmin, whereas rows No. 8 to No. 14, corresponding to the right half of the mask represented in FIG. 16 which forms a second sub-pattern, would then be illuminated by the beam of wavelength λmax. Thus, the demarcation $d_f$ between rows No. 7 and No. 8, represented by chain line, would indeed be superposed in relation to the boundary between the beams of wavelength λmin and λmax.

It is furthermore to be noted here that the rows of the first sub-pattern have been mixed, in that they do not succeed each other in the order of the powers of 2, they are for example arranged in the following order: 2^2, 2^4, 2^6, 2^7, 2^5, 2^3, 2^1. To be precise, the basic pattern (left half or right half of the dual coding pattern represented in FIG. 16 since in that example the two sub-patterns are identical) correspond to the canonical binary mask of degree 7, as explained earlier. As represented in this Figure, the basic canonical pattern of the dual binary mask does not necessarily need to be organized by increasing values as in the case of FIGS. 9 to 14: any permutation into row and column in that basic pattern does not reduce the spectral encoding richness.

Furthermore, as the second sub-pattern here is identical to the first sub-pattern, it thus comprises the same mixture of rows.

Thus in this example embodiment of the mask, all the columns are different from each other.

With the selected adjustment of the micromirrors of the DMD cell in the present example embodiment, the optical beam reflects in a direction non-coplanar with the plane of the diagram (the beam heads a little downwardly). The angle between the average axis of the incident beam and the horizontal projection of the reflected beam is approximately 16°.

Here, in particular to compensate for the vertical angular component induced on reflection of the beam on the DMD cell in order to bring the beam into a horizontal plane, the projector comprises a planar mirror 100. For example, the angle between the horizontal projections of the normal to the planar mirror 100 and the average axis of the incident beam coming from the multiplicative coding device 5 is approximately 29°.

At the output from the encoding device 5, the projector comprises the optical system for spectral recombination 8. The optical system for spectral recombination 8 is configured to recombine, into a recombined beam, the spectrally decomposed spectrum encoded by the encoding device 5. It for example comprises here a prism 130.

Furthermore, in the present example embodiment, the projector comprises in series an objective 110, the prism 130 of the optical system for spectral recombination 8, a planar mirror 120 and an objective 140 which are respectively identical to the elements 80, 3, 60 and 50 disposed in inverse order. That is to say, for example, that the objectives 110 and 80 are identical, the prism 130 is identical to the prism 70 and its input face is oriented at 25° relative to the average axis of the incident beam which comes from the objective 110, the planar mirror 120, of which the normal is oriented at approximately 47° relative to the average axis of the incident beam coming from the prism 130, is identical to the planar mirror 60, and the objective 140 is identical to the objective 50. The plane in which is positioned the mask 90 is situated at the location of the object focus of the objective 110.

In this example embodiment, the elements 100, 110, 8, 120 and 140 thus enable not only to recombine the light dispersed by the elements 50, 60, 3 and 80 and encoded by the multiplicative coding device 5, but also to form an intermediate image 40' of the diaphragm 40 at a determined position while limiting the bulk of the projector.

The image 40' obtained then here has the following properties: its dimensions are 10×7.5 mm² and it is segmented into $2^7$ horizontal spectrally-structured light bands. The spectral structuring is such that whatever the (fine) vertical cross-section considered of that image, it is composed of $2^7$ elements/structured pixels of spectral encodings that are different from each other.

The intermediate image 40' is lastly projected onto the scene to study using the optical system for projection 150. The optical system for projection 150 comprises for example an objective of which the focal length is approximately 30 mm.

In the example embodiment of FIG. 16, the projected field obtained thus measures approximately 100×75 cm² (height× width) at a distance of 3 meters from the objective 150.

Lastly, the focal lengths of the optical elements 50, 80, 110 and 140, the dimensions of the diaphragm 40, the angular dispersion power of the dispersion system 3 and the dimensions of the optical field of the mask are chosen in consistent manner. In this example, the different aforementioned elements have, for example, been defined in the following manner:

The DMD cell and the prisms have been determined a priori by their ease of use, their convenience and their availability.

In order for the optical enlargement between the position of the diaphragm 40 and the mask 90 to be unitary (for the purpose of simplicity, although this is not mandatory), the optical elements 50, 80, 110 and 140 are identical: therefore, in the direction perpendicular to the direction associated with the spectral dispersion (that is to say here in the vertical direction), the dimension of the diaphragm is set at 10 mm in order for its image to be adapted exactly to one of the dimensions of the mask 90, that is to say here the height, i.e. 10 mm, of the DMD cell.

The other dimension of the diaphragm has been set at half the length (15 mm) of the optical field of the mask 90, i.e. here 7.5 mm in the case of the DMD cell.

In the direction associated with the spectral dispersion, the choice of the focal length of the optical elements 50, 80, 110 and 140 is linked to the angular dispersion power of the optical system for spectral decomposition, in this case the prism 70 used. The value of the focal length is calculated such that the image of an infinitely narrow slot placed at the location of the diaphragm (and oriented perpendicularly to the direction associated with the spectral dispersion, that is to say vertically) would cover, after dispersion into wavelengths, half the width (15 mm) of the optical field of the mask, here of the DMD cell, i.e. 7.5 mm. The range of the wavelengths considered by way of example for this calculation here extends from $\lambda min$=400 nm to $\lambda max$=680 nm. Given the unitary optical enlargement between the position of the diaphragm and the mask and the extent of the spectral dispersion produced at the position of the mask, the figure of light (visible to the eye) obtained on the mask would thus cover the entirety of the useful optical field of the latter (i.e. 10×15 mm² in the case of the DMD cell used here). Therefore, in this example, the "traces" $S_{\lambda min}$ and $S_{\lambda max}$ of the bounding beams $F_{\lambda min}$ and $F_{\lambda max}$ are juxtaposed in the plane of the multiplicative coding device 5.

This example embodiment illustrates the preferred configuration of the invention: the coding pattern of the multiplicative coding device 5 is binary and the optical system for spectral recombination 8 spectrally recombines the light beam while fully compensating for the geometrical separation of the incident rays that is dependent on the wavelength which was produced by the optical system for spectral decomposition 3.

Figure 17:
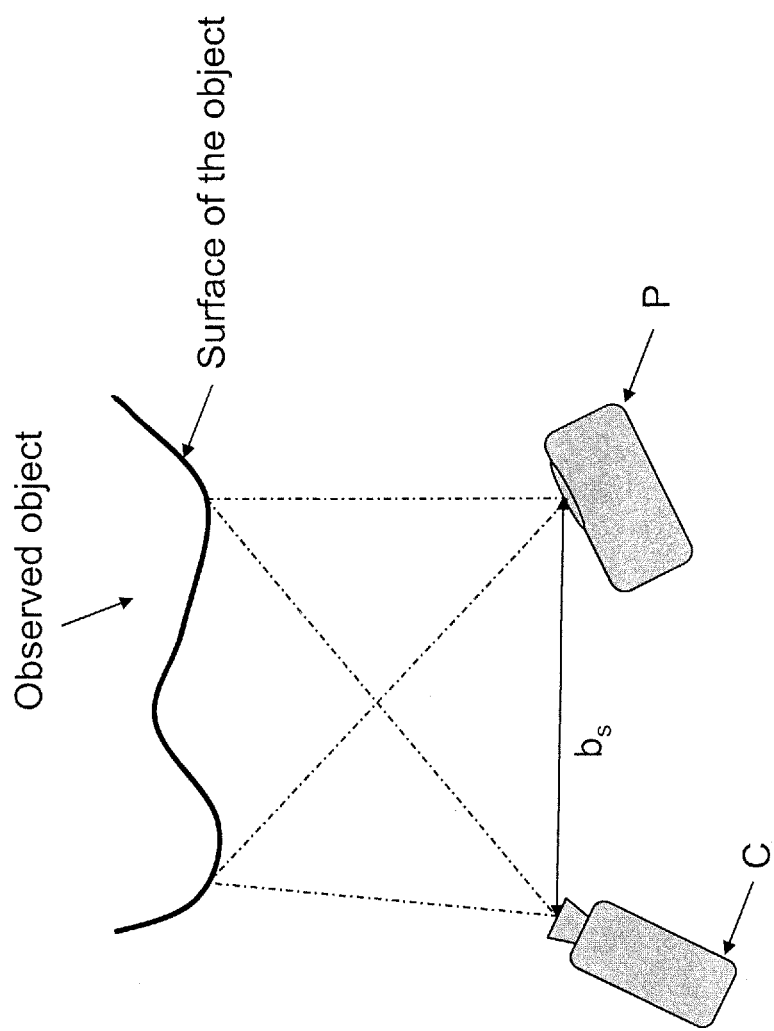

FIG. 17 diagrammatically represents a structured-light three-dimensional scanner according to an example embodiment of the present invention. It comprises a projector, here positioned on the right side, and a detection device, here positioned on the left side, at a distance $b_s$ from the projector, called "stereo basis".

For the acquisition, the detection device used is here for example a hyperspectral camera of trademark SPECIM with a rotating mirror (model Kappa DX4 PS); it comprises 256 pixels (the columns of the image)×512 pixels (the rows of the image). The camera is for example positioned above the projector, the projection axis of the projector and that of the objective of the camera then being in the same vertical plane, but of course, they could be disposed one beside the other. The stereo basis (the distance $b_s$) is then vertical and, here, for example is equal to 10 cm. An advantageous option is for example to perform the acquisition over 7 spectral channels $C_1$ to $C_7$ in order to comply with the segmentation by wavelength induced by the geometry of the mask used.

Nevertheless, to illustrate the fact that the segmentation by wavelength may be set by the detection device of the scanner in which is used the device for spectral encoding of light beams (in particular when the mask is not organized into rows and columns), the acquisition was made over 7 contiguous spectral channels, called $C'_1$ to $C'_7$, of identical spectral widths (40 nm) and extending from $\lambda min$=400 nm to $\lambda max$=680 nm which are represented in FIG. 18 with reference to the example detailed here-below.

The evaluation measurements were made in a room of approximately 4×5 m², illuminated by a uniformly distributed ceiling-based illumination of halogen type and approximately 600 W of power in total. A large sheet of white paper, bonded to a rigid backing to form a flat screen and a metal object covered with mat beige-colored paint of which the dimensions were approximately 20×20×20 cm³ (in that case it was the frame of a laboratory light source) were successively used to perform the evaluation tests. They were positioned at a distance of approximately 1.5 m from the camera.

A few images of the white screen (FIG. 18*c*) and of the metal object (FIG. 18*d*) which were obtained with the hyperspectral camera are provided in FIG. 18 (acquisition channels $C'_1$ to $C'_5$ uniquely in the interest of simplification). In this example, the field of the camera is less than the field of the projector. In these images, the camera offset and the signal level linked to the ambient lighting have been subtracted. Furthermore, the lobe effect of the projected beam, that is to say the spatial non-uniformity of its flux, has been corrected: the image of the apparent lobe observed by the camera is obtained by projecting onto the planar screen a non-encoded incident beam, that is to say for example using the DMD cell as a planar mirror without (even partially) concealing certain rays. The dual coding pattern used is represented in FIG. 18*a* (which is that of canonical basis 7 described in relation to FIG. 16). The rotation of the pattern, relative to the horizontal direction of the Figure, is for the purpose of reproducing the rotation induced by the optical configuration for acquisition of the hyperspectral camera: the "columns" of the camera sensor were not vertical in the test performed. It is found, for each acquisition channel $C'_1$ to $C'_5$, by observing the framed zone of the coding pattern (represented in FIG. 18b) and the two corresponding images (FIGS. 18c and 18d respectively representing the case of the flat screen and of the metal object) that it is possible to show the "useful" zone of the mask that actually coded the light beam in the field observed by the camera. In other words, these are the parts of the mask actually "seen" by the different spectral channels. These zones of the mask are convolved by a blur which is induced by the spectral width (here 40 mm by way of example) of the spectral channels of the camera. Thus blur is similar to a movement blur in the direction associated with the spectral dispersion since a wavelength offset leads to a geometrical offset of the projected mask zone as shown by FIG. 5c (but also FIG. 10). It is also possible to observe notable geometrical deformations of these mask zones (presence of a striated effect in the form of horizontal lines) on the images of the planar screen: they are mainly due to the defects in spatial uniformity produced by the powering by motor of the rotating mirror of the hyperspectral mirror used (the model is rather old). Lastly, the deformation of the projected FIG. with the relief is easy to observe by comparing the images obtained with the metal object (FIG. 18d) and those obtained with the flat screen (FIG. 18c).

The invention claimed is:

1. A structured-light projector successively comprising:
   a light source configured to emit a beam with a continuous spectrum between a minimum wavelength ($\lambda$min) and a maximum wavelength ($\lambda$max),
   an optical system for spectral decomposition, configured to capture the spectrum of the beam emitted by the source and to spectrally decompose the spectrum with an image of the beam at the minimum wavelength ($\lambda$min) juxtaposed with an image of the beam at the maximum wavelength ($\lambda$max) in at least one predetermined plane that is transverse to an optical path of the beam and along a line of the at least one predetermined plane constituting a boundary,
   an encoding device configured to encode the spectrally decomposed spectrum, the encoding device comprising a mask,
   the mask positioned in the at least one predetermined plane, and
   the mask comprising a binary encoding matrix pattern formed from a series of 2*n rows and a series of m columns, wherein "n" is equal to or greater than 4, and wherein "m" is equal to or greater than 16,
   a demarcation between the rows "n" and "n+1" superposed on the boundary,
   a sub-pattern defined by the rows "1" to "n" illuminated by the image of the beam with the wavelength $\lambda$min and a sub-pattern defined by the rows "n+1" to "2*n" illuminated by the image of the beam with the wavelength $\lambda$max,
   the sub-pattern defined by the rows "1" to "n" identical to or complementary with the sub-pattern defined by the rows "n+1" to "2*n", and
   a sub-pattern defined by the rows "i" to "i+n−1", where i is between 2 and n is illuminated by an image of the beam with a given wavelength $\lambda$ between $\lambda$min and $\lambda$max,
   the m columns perpendicular to the demarcation and two neighboring columns each comprising a different binary encoding from the other,
   an optical system for spectral recombination configured to recombine the spectrally decomposed and encoded spectrum into a recombined beam, and
   an optical projection system configured to project the recombined beam onto a scene to observe.

2. The projector according to claim 1, wherein the mask comprises at least m/5 different encodings in the m columns.

3. The projector according to claim 1, wherein an encoding is repeated in at most 5 columns.

4. The projector according to claim 1, wherein the m columns of the sub-pattern defined by rows "1" to "n" comprise a maximum of 5 repetitions of the same series of encodings that are different from each other.

5. The projector according to claim 1, wherein the m columns of the sub-pattern defined by rows "1" to "n" comprise encodings that are all different from each other.

6. The projector according to claim 1, wherein the number of columns "m" is equal to "2^n".

7. The projector according to claim 1, wherein the rows of the sub-pattern defined by rows "1" to "n" comprise encodings that represent a succession of powers of 2.

8. The projector according to claim 1, wherein the light source comprises a natural light source, an artificial light source, a continuous artificial light source, a filament lamp or incandescent lamp, a halogen lamp, or an LED.

9. The projector according to claim 1, wherein the encoding device comprises a matrix arrangement of reflective zones and absorbent zones.

10. The projector according to claim 1, wherein the encoding device comprises a matrix arrangement of transparent zones and opaque zones.

11. The projector according to claim 1, wherein the encoding device comprises an opto-electronic system constituted by pixels of which the optical transparency is electronically controllable, the mask being formed by the opto-electronic system.

12. The projector according to claim 1, wherein the encoding device comprises an opto-electronic system constituted by pixels of which the optical reflectivity is electronically controllable, the mask being formed by the opto-electronic system.

13. The projector according to claim 12, wherein the optical system for spectral decomposition comprises an optical prism or an optical grating.

14. The projector according to claim 1, wherein the optical system for spectral recombination comprises an optical prism or an optical grating.

15. A structured-light three-dimensional scanner comprising a projector and a detection device, wherein the projector comprises a projector according to claim 1, wherein the detection device is a multi-spectral camera comprising at least 4 spectral channels, the camera being disposed at a determined distance from the projector.

16. The structured-light three-dimensional scanner according to claim 15 further comprising an electronically controllable secondary light source of which the spectrum is continuous between the minimum wavelength ($\lambda$min) and the maximum wavelength ($\lambda$max).

17. The projector according to claim 11, wherein the optical system for spectral decomposition comprises an optical prism or an optical grating.

* * * * *